US011257216B2

(12) United States Patent
Merlo et al.

(10) Patent No.: US 11,257,216 B2
(45) Date of Patent: Feb. 22, 2022

(54) SAMPLE IMAGING AND IMAGERY ARCHIVING FOR IMAGERY COMPARISON

(71) Applicant: LeanAP, Inc., Sterling Heights, MI (US)

(72) Inventors: Philip T. Merlo, Clarkston, MI (US); Patrick Aloysius Merlo, Troy, MI (US); Matthew Andrew Laise, Utica, MI (US); John Jacob Torongo, Thompsonville, MI (US); Filippo Fraggetta, Catania (IT); Liron Pantanowitz, Wexford, PA (US); Larry Michaels, Southfield, MI (US)

(*) Notice: Subject to any disclaimer, the term of this patent is extended or adjusted under 35 U.S.C. 154(b) by 114 days.

(21) Appl. No.: 16/688,613

(22) Filed: Nov. 19, 2019

(65) Prior Publication Data

US 2020/0160522 A1 May 21, 2020

Related U.S. Application Data

(60) Provisional application No. 62/769,965, filed on Nov. 20, 2018.

(51) Int. Cl.
*G06T 7/00* (2017.01)
*B01L 9/00* (2006.01)
(Continued)

(52) U.S. Cl.
CPC .............. *G06T 7/0014* (2013.01); *B01L 9/52* (2013.01); *G01N 1/286* (2013.01); *G02B 21/06* (2013.01);
(Continued)

(58) Field of Classification Search
CPC ...... G02B 21/367; G02B 21/34; G02B 21/06; G01N 1/286; G06T 7/0014; G06T 2207/20212; G06T 2207/30024; G06T 2207/10056; G06T 2207/10152; B01L 9/52; B01L 2300/0609; B01L 2300/024; B01L 2300/06; B01L 2300/021; B01L 2300/025; B01L 2300/0822
See application file for complete search history.

(56) References Cited

U.S. PATENT DOCUMENTS

2006/0199169 A1  9/2006  Lam et al.
2009/0247416 A1  10/2009  Can et al.
(Continued)

OTHER PUBLICATIONS

International Search Report and Written Opinion of the International Searching Authority from corresponding PCT Application No. PCT/IB2019/059949, dated Feb. 27, 2020.

*Primary Examiner* — Brenda C Bernardi
(74) *Attorney, Agent, or Firm* — Gardner, Linn, Burkhart & Ondersma LLP

(57) ABSTRACT

An apparatus and method are provided for imaging and analyzing images of tissue samples. The apparatus includes an imager, a lighting system, and a processor. The imager is configured to capture images within a selectable field of view. A tissue sample container is positionable within the field of view. The imager is configured to capture images of a plurality of tissue sample containers. The lighting system is configured to illuminate the field of view. The processor is configured to receive a first plurality of captured images of tissue sample containers. The processor is configured to analyze the first plurality of captured images and to determine whether there is tissue missing from any ones of the first plurality of captured images.

25 Claims, 18 Drawing Sheets

(51) Int. Cl.
*G01N 1/28* (2006.01)
*G02B 21/34* (2006.01)
*G02B 21/36* (2006.01)
*G02B 21/06* (2006.01)

(52) U.S. Cl.
CPC ........... *G02B 21/34* (2013.01); *G02B 21/367* (2013.01); *B01L 2300/024* (2013.01); *B01L 2300/025* (2013.01); *B01L 2300/06* (2013.01); *B01L 2300/0609* (2013.01); *G06T 2207/10056* (2013.01); *G06T 2207/10152* (2013.01); *G06T 2207/20212* (2013.01); *G06T 2207/30024* (2013.01)

(56) References Cited

U.S. PATENT DOCUMENTS

| | | |
|---|---|---|
| 2010/0026785 A1 | 2/2010 | Soto-Thompson et al. |
| 2011/0034341 A1 | 2/2011 | Mehes et al. |
| 2018/0012355 A1 | 1/2018 | Sarkar et al. |

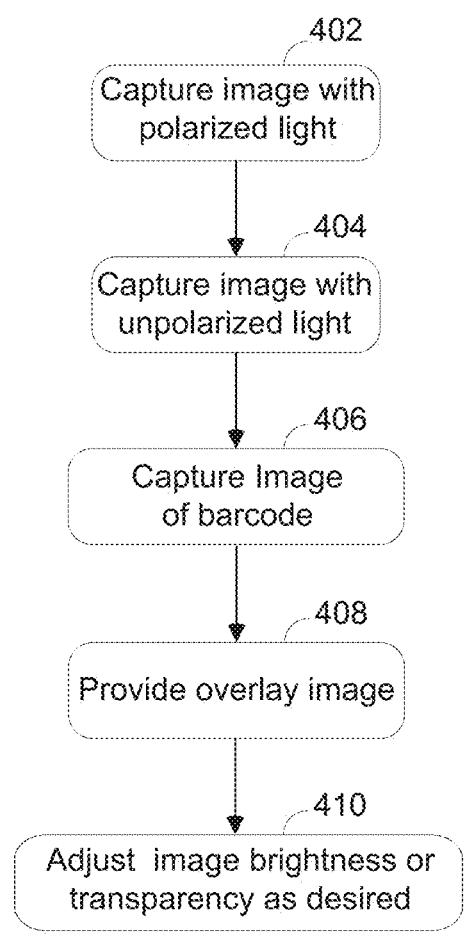

1" (25mm) x 3" (75mm)
Microscopy Slide

1" (25mm) x 3" (75mm)
Microscopy Slide
Side View

1" (25mm) x 3" (75mm)
Microscopy Slide
Front View

Small Cassette w/ specimen in wax

Small Cassette w/ specimen in wax
(Front View w/Barcode)

Small Cassette w/ specimen in wax
(Side View)

Large Cassette with Wax

Large Cassette with Wax
(Front View)

Large Cassette with Wax
(Side View)

SAMPLE IMAGING AND IMAGERY ARCHIVING FOR IMAGERY COMPARISON

CROSS REFERENCE TO RELATED APPLICATION

The present application claims the benefit of U.S. provisional application Ser. No. 62/769,965, filed Nov. 20, 2018, which is hereby incorporated herein by reference in its entirety.

FIELD OF THE INVENTION

The present invention is directed to the capturing of tissue sample images, and in particular, the archiving of captured tissue sample images for later image comparison.

BACKGROUND OF THE INVENTION

Conventional tissue samples, such as those processed and studied in a biobank or pathology department, or other similar facility, are often embedded into paraffin wax blocks for later sectioning or slicing. The paraffin block supports the tissue sample such that the tissue sample may be thinly sliced. Such slicing is generally performed with a microtome or other similar tissue slicing instruments. The paraffin embedded tissue blocks are sliced (sectioned) with each slice of the tissue placed onto respective slides. Each sample slice is processed and the final stained tissue sample slice covered and then stored. Each of the stored tissue slides may also be individually identified for later retrieval.

SUMMARY OF THE INVENTION

Embodiments of the present invention provide an apparatus and methods for imaging tissue biopsy cassettes, microscope slides, and other tissue containers as well as the specimen tissue therein contained (also known herein as tissue/block/sample containers).

In an aspect of the present invention, an apparatus is provided for barcode tracking, imaging, and analyzing images of tissue samples. The apparatus includes an imager, controller, an actuated lens, a range finder, a sample holder, a lighting system, and a processor. The imager is configured to capture images within a selectable field of view. A sample/block/tissue container is positionable within the field of view. The imager is configured to capture images of a plurality of sample/tissue containers. The sample holder is configured to provide adjustable support for each type of sample container as well as providing an optical path for imaging barcodes not in a direct field of view, as well as providing an encoding system to identify the sample container type at the time of image capture. The lighting system is configured to illuminate the field of view. The processor is configured to receive a first plurality of captured images of sample/tissue containers. The processor is configured to analyze the first plurality of captured images and to locate and read the barcode for the purpose of providing a base filing identifier for automatic archiving of the images. Additional images of the first plurality of captured images are used for documentation purposes and are analyzed by the processor to determine whether there is tissue missing from any one of the first plurality of captured images.

In a further aspect of the present invention, a method for capturing images of tissue samples includes positioning tissue sample containers within a selectable field of view. The tissue sample containers positioned within the field of view are illuminated. Images of the tissue sample containers positioned within the field of view are captured. A first plurality of captured images of tissue sample containers are arranged as a progressive series of paired images. The method further includes storing the first plurality of captured images in an archive.

In another aspect of the present invention, a method for capturing images of tissue samples includes providing an imager system for capturing the images that includes a light source for lighting a field of view, a processor for processing the captured images, and a range finder for determining a focus of the imager. The method further includes determining a focus for the imager for a cut surface of a sample/block. The focus will vary depending on an amount of cutting performed prior to each imaging. The range finder is calibrated to focal positions of an actuated lens of the imager. The light source and the imager are positioned with respect to the cut surface at an angle of 10-20 degrees from perpendicular, such that the reflecting light angles off the sample/block to enhance the cut surface of the sample/block. The imager and the light source are positioned relative to each other at a sample angle. A first image is captured and processed with the processor to indicate where boundaries of the cut tissue exist in the first image. The light source is polarized such that light reflecting off the cut surface is eliminated, such that subsurface (uncut tissue) is observable. A second image is captured with the polarized light. The first and second images are compared by the processor. Such comparison includes overlaying one of the first and second images upon the other of the first and second images, such that those parts of the sample tissue are identified that are below the surface and therefore not cut and not transferred to a slide for examination. Lastly the method includes providing adjustable viewing controls to improve an observer's ability to distinguish those parts of the sample tissue that are below the surface of the sample/block.

In an aspect of the present invention, the range finder is a pair of ultrasonic time-of-flight (TOF) sensors.

In a further aspect of the present invention, the imaging system further includes a polarized light source and a shallow pocket configured to support standard, 25 mm×75 mm microscopy slides and 50 mm×75 mm microscopy slides on a white background for aiding in capturing images of barcodes to provide a base filing identifier, as well as capturing images suitable for processing to indicate where cut tissue boundaries exist.

In another aspect of the present invention, the processor is configured to compare a first image of a paraffin wax embedded tissue sample block to a second image of a tissue sample slide. The first image comprises an image of tissue present in the second image. The processor is further configured to determine whether any of the tissue present in the first image is missing from the second image.

Thus, tissue sample slides and paraffin wax embedded tissue sample blocks may be imaged and the resulting images archived (e.g., stored in a database in a memory). These archived images may then be indexed by patient/case such that a series of images related to a particular patient/case may be retrieved and analyzed at a later date. Such analysis may include image analysis of a progressive series of "final" slide images and block images to determine if there is any tissue missing from the final slide images.

These and other objects, advantages, purposes and features of the present invention will become apparent upon review of the following specification in conjunction with the drawings.

BRIEF DESCRIPTION OF THE DRAWINGS

FIG. 4 is a flow diagram illustrating a method for capturing images used to determine if there is any tissue missing from slide images;

DESCRIPTION OF THE PREFERRED EMBODIMENTS

Figure 1:
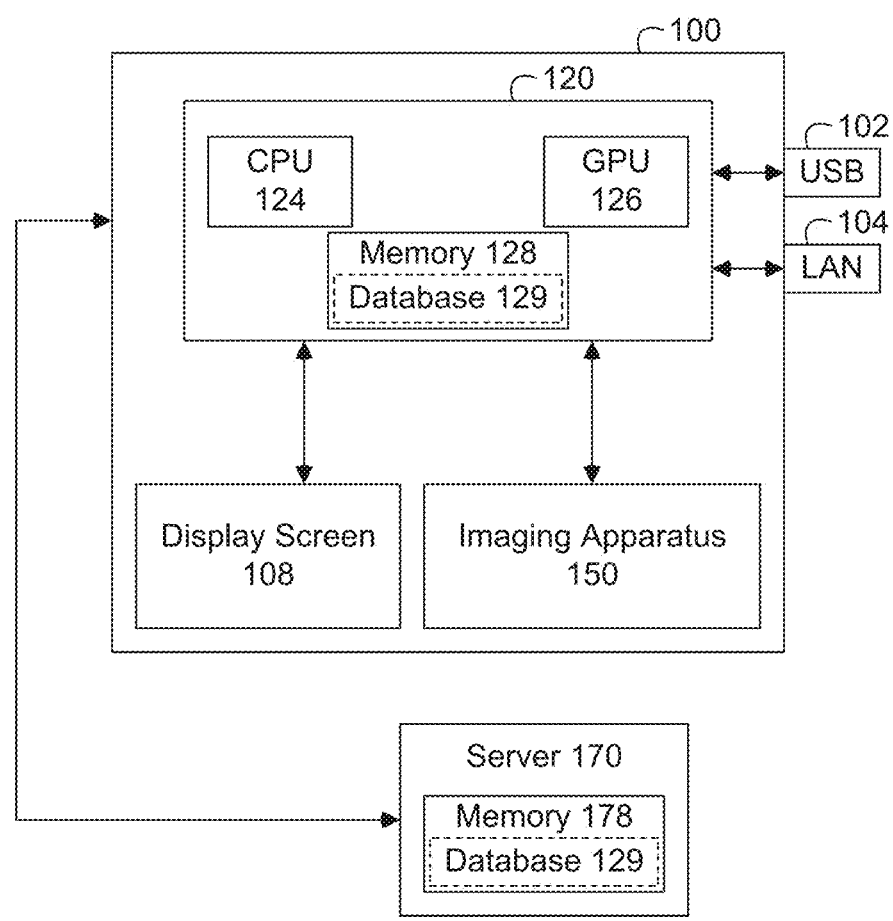
FIG. 1 is a block diagram of an exemplary imaging apparatus in accordance with the present invention.

Referring to the drawings and the illustrative embodiments depicted therein, an imagery management system and methods are provided for archiving images of paraffin embedded tissue blocks (hereinafter "blocks") into the electronic files of a laboratory information system ("LIS") that are related to the tissues. The electronic files may also be related or linked to a patient from which the tissue sample was excised. One purpose of the imaging is to record a "pattern" of the cut tissue as well as the subsurface tissue present in a particular block for later comparison to images taken of the final stained and cover slipped slides (e.g., the slides may be imaged using whole slide imaging (WSI) to ascertain whether any tissue (i) was not cut that should have been cut, or (ii) was lost during tissue/cassette and slide processing (note that such tissue may also be "lost" from image acquisition and processing). Optionally, the imagery management system and methods may incorporate automated image recognition algorithms to determine if any tissue is missing from a final slide and provide a user with an alert to inform the user that a particular slide is missing tissue relative to the tissue block (i.e., the original tissue block images). Additionally, the imagery management system and methods may provide a data management system for acquired images that may be used for recording and reporting mismatches. Therefore, as discussed herein, the exemplary imagery management system includes an imaging apparatus, an image acquisition and archiving module, and an image analysis module.

Figure 6A:
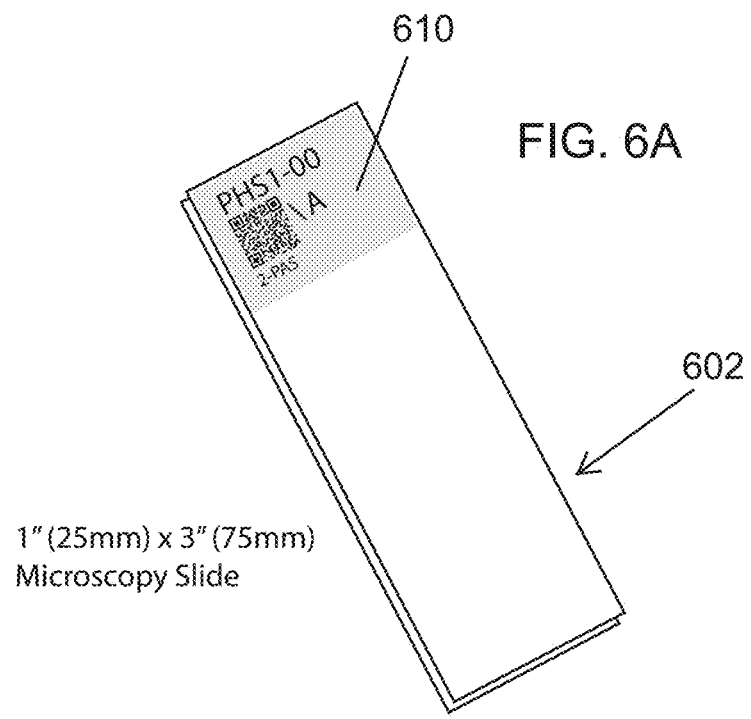
FIG. 6A is a perspective view of a microscopy slide illustrating the placement of a barcode in accordance with the present invention.
Figure 6B:
FIG. 6B is a side view of the microscopy slide of FIG. 6A.
Figure 6C:
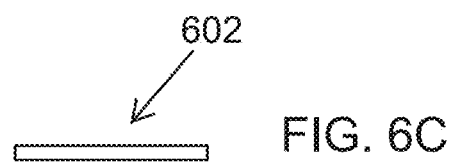
FIG. 6C is a front view of the microscopy slide of FIG. 6A.
Figure 7A:
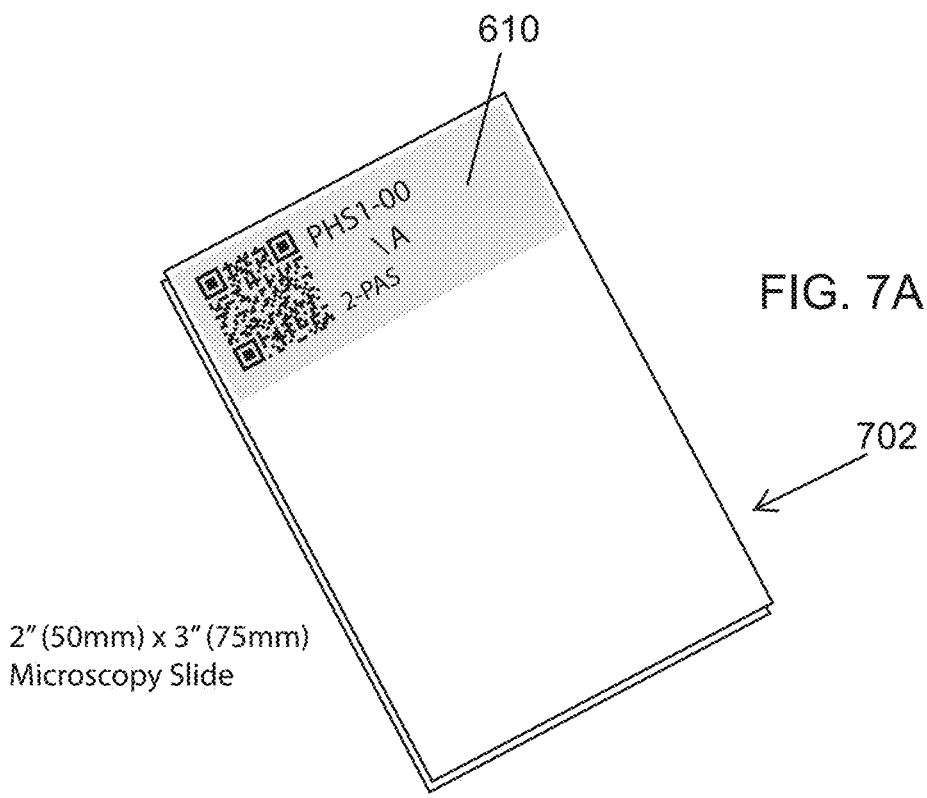
FIG. 7A is a perspective view of another microscopy slide illustrating the placement of a barcode in accordance with the present invention.
Figure 7B:
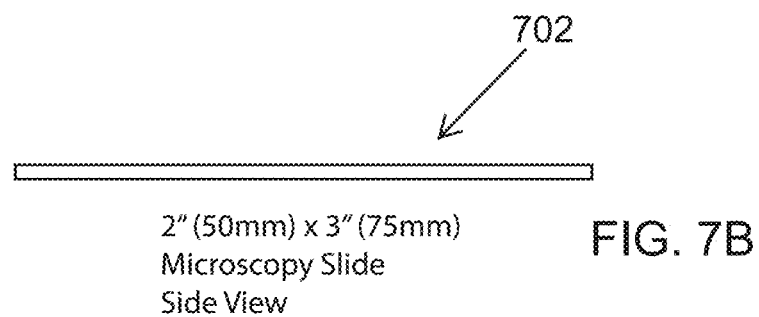
FIG. 7B is a side view of the microscopy slide of FIG. 7A.
Figure 7C:
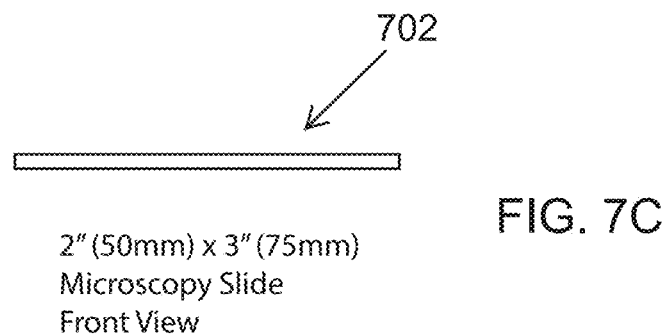
FIG. 7C is a front view of the microscopy slide of FIG. 7A.
Figure 8A:
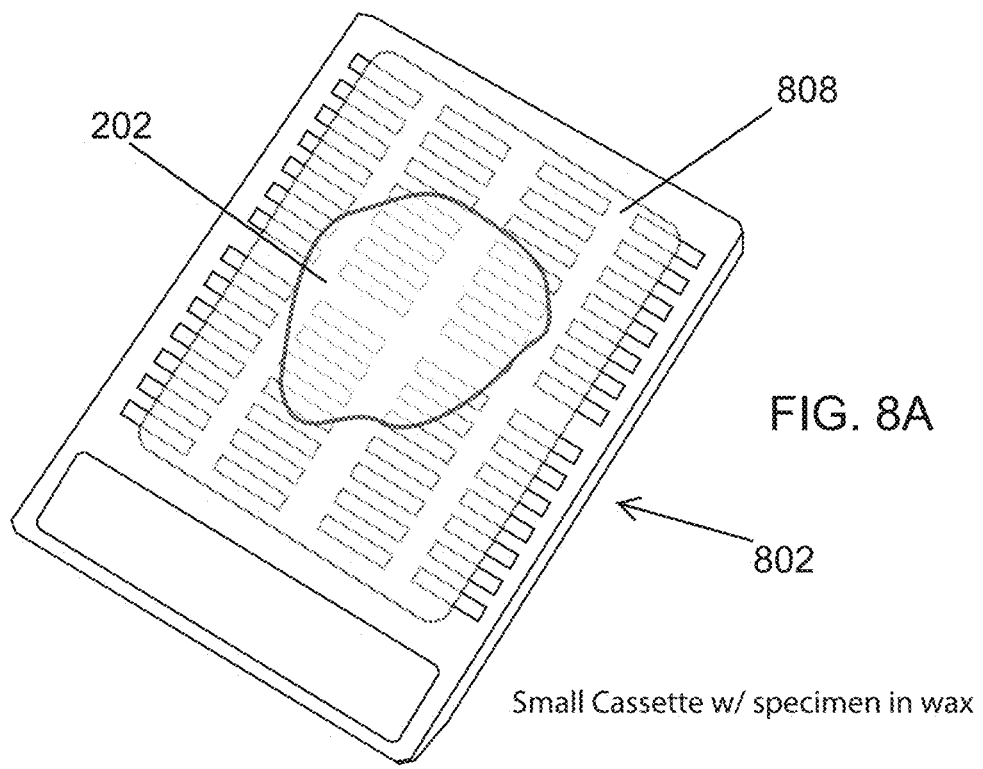
FIG. 8A is a perspective view of a small cassette illustrating a tissue sample/wax block positioned on the small cassette in accordance with the present invention.
Figure 8B:
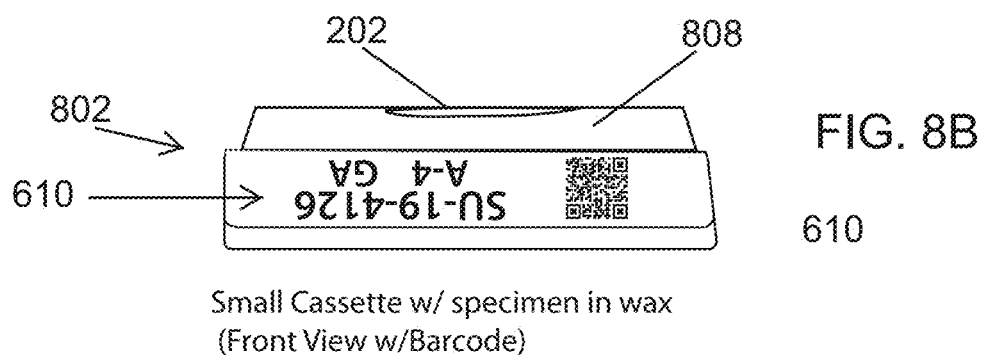
FIG. 8B is a front view of the small cassette of FIG. 8A illustrating the tissue sample/wax block placed on the small cassette.
Figure 8C:
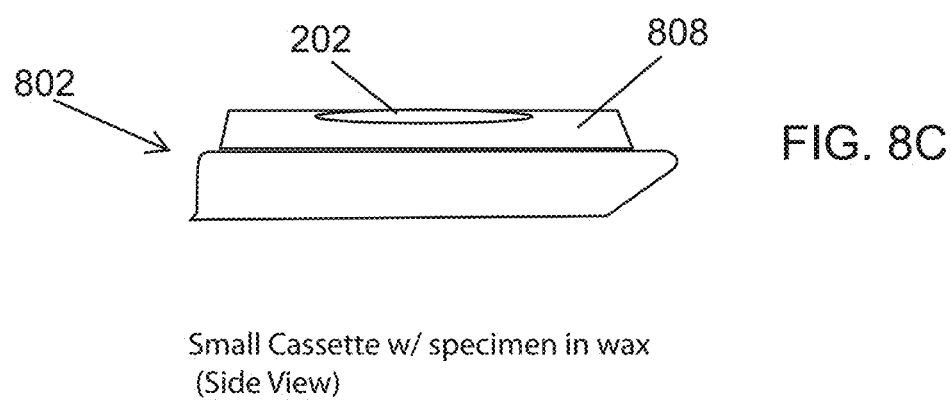
FIG. 8C is a side view of the small cassette of FIG. 8A.
Figure 9A:
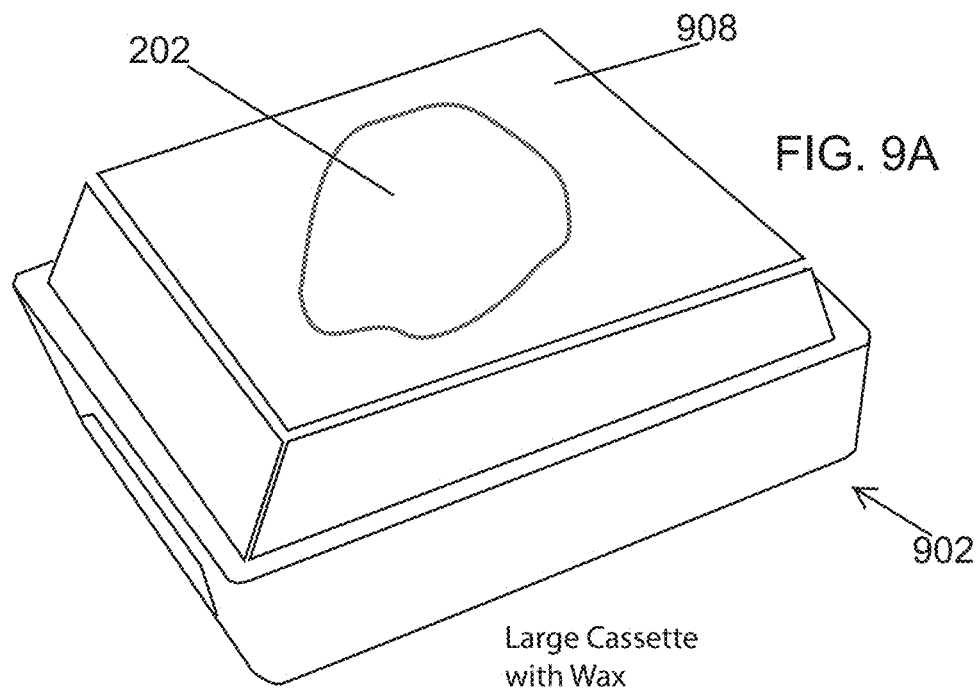
FIG. 9A is a perspective view of a large cassette illustrating a tissue sample/wax block positioned on the large cassette in accordance with the present invention.
Figure 9B:
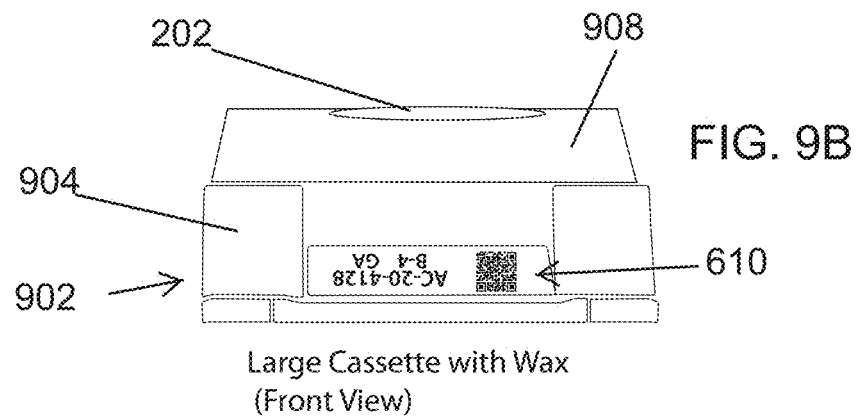
FIG. 9B is a front view of the large cassette of FIG. 9A illustrating the positioning of the tissue sample/wax block on the large cassette and the placement of a barcode.
Figure 9C:
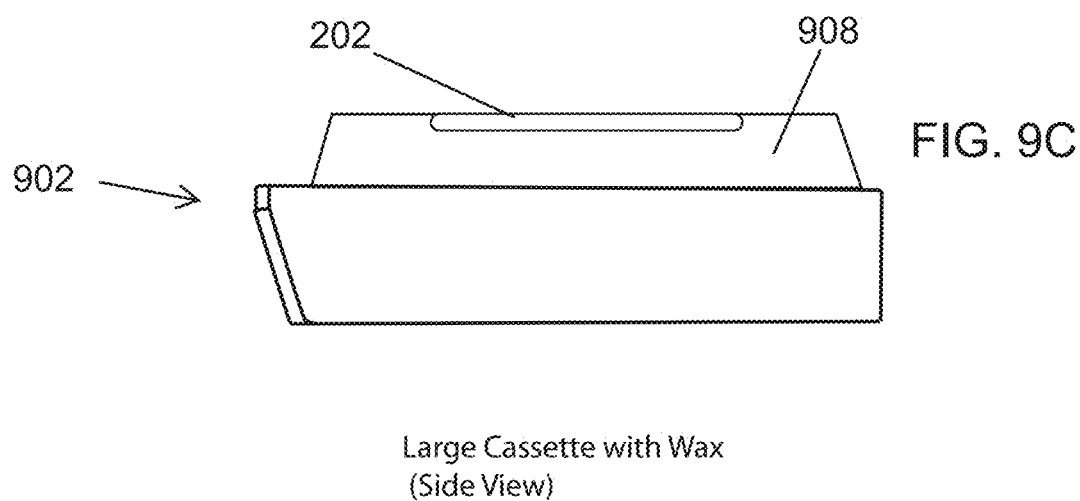
FIG. 9C is a side view of the large cassette of FIG. 9A illustrating the positioning of the tissue sample/wax block on the large cassette.

FIG. 1 illustrates an exemplary imagery management system 100, which includes an analyzer/image processor 120 and an imaging apparatus 150. As illustrated in FIG. 1, the analyzer/image processor 120 includes an image acquisition and archiving module and an image analysis module, both of which may be implemented as separate hardware modules of a multi-core graphics processing unit (GPU) 126 or as software modules implemented by a multi-core micro processing unit (CPU) 124. FIG. 1 also illustrates the imagery management system 100 communicatively coupled to a server 170 that provides the storage and retrieval of archived imagery, such as a database 129 stored in a memory 178. The imaging apparatus 150 may be implemented as either a stand-alone instrument 150 (see FIG. 2A) or the imager 152 may be incorporated as an accessory of a tissue slicing instrument 210 (e.g., a microtome or other similar instruments). The imaging apparatus 150 captures images of tissue samples 202 such as paraffin wax embedded tissue samples 808, 908 (see FIGS. 8 and 9) or slides 602, 702 carrying tissue sample slices (see FIGS. 6 and 7).

Optionally, and as illustrated in FIG. 1, the imagery management system 100 includes external data ports 103 (such as USB ports) arranged on a housing to facilitate accessory connections (e.g., mouse, keyboard, barcode scanner, and thumb drive access). An external LAN port 104 or other suitable data connection may also be provided to allow for connection to an institution's network. An external power switch may be arranged for powering ON/OFF the lighting system 156, 256. Similarly, a main power switch for the analyzer/image processor 120 and imaging apparatus 150 may also be arranged on the housing of the imagery management system 100.

The image acquisition and archiving module of the analyzer/image processor 120 provides a user interface (displayed on a display screen 108 of the imagery management system 100) for control of the imaging apparatus 150. The image acquisition and archiving module may also provide a user with access to a hospital or similar institute's information technology (IT) infrastructure and electronic archives. The image acquisition and archiving module may also read an identifier barcode on images of cassettes 802, 902 (configured to hold paraffin wax blocks 808, 908) and tissue sample carrying microscopy slides 602, 702 to allow for the automatic archiving of the associated images (see FIGS. 6-9). The image analysis module of the analyzer/image processor 120 analyzes the images of the blocks and the slide images (e.g., WSI) and provides a PASS/FAIL output to the user indicating if any tissue is missing from an image of a finalized slide 602, 702. Additionally, the image analysis module will archive the imagery analysis results into the specific patient/case electronic files stored in the LIS.

Figure 2A:
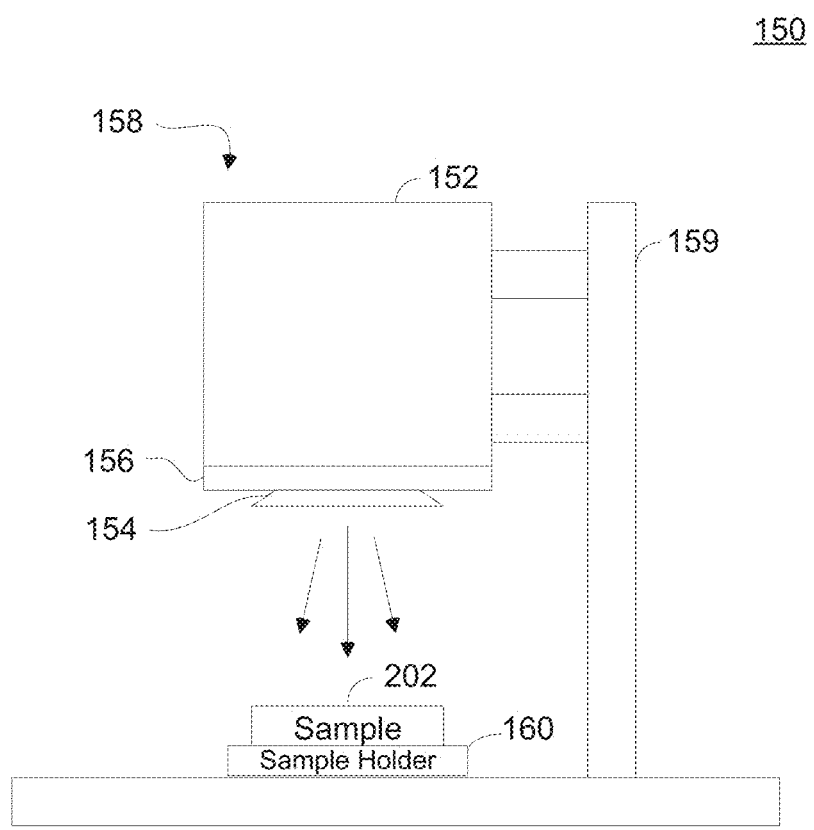
FIG. 2A is a side view of an exemplary imager positioned with respect to a tissue sample in accordance with the present invention.

FIG. 2A illustrates the imaging apparatus 150 implemented as an exemplary stand-alone unit. The imaging apparatus 150 includes a computer-controlled imager 152 (as illustrated in FIG. 1, the imaging apparatus 150 is communicatively coupled to the analyzer/image processor 120, which, as noted above, controls the operation of the imaging apparatus 150). Optionally, the imaging apparatus 150 is coupled to the analyzer/image processor 120 via a computer interface (e.g., USB 3.0). The imager 152 includes a lens system 154 that is adjustable for a desired focus and/or iris setting. Optionally, the lens system 154 may be a manual lens with manually selectable focus, shutter speed, and iris (aperture) controls. In a further optional embodiment, the lens system 154 has automatic settings that are adjustable via the analyzer/image processor.

Figure 2B:
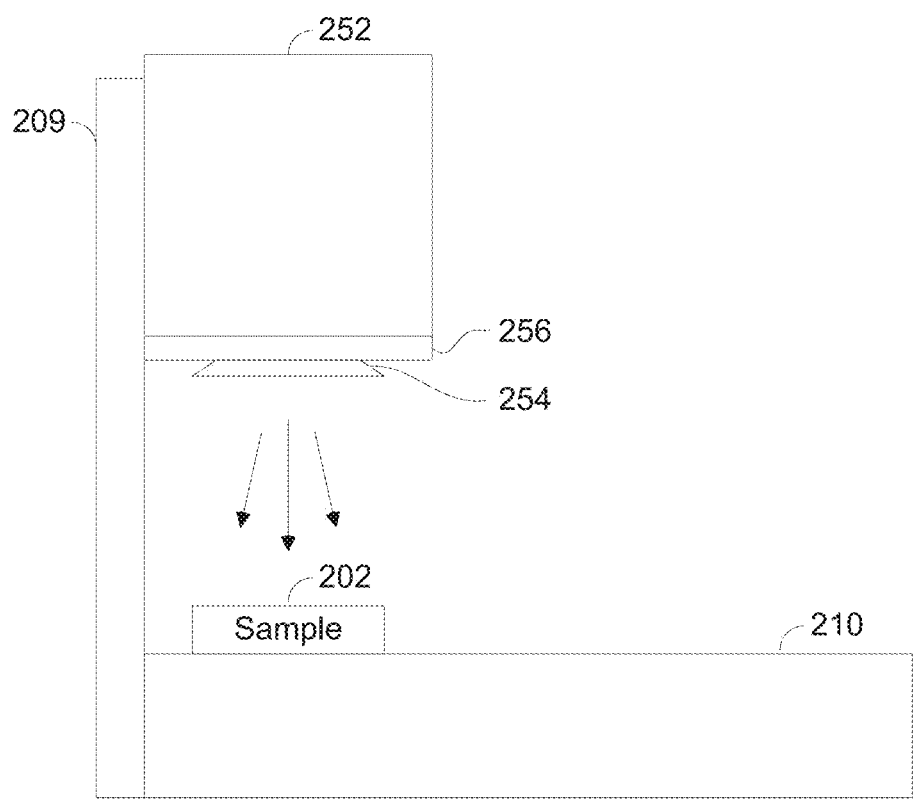
FIG. 2B is a side view of another exemplary imager integrated into a tissue slicing instrument in accordance with the present invention.

As illustrated in FIG. 2A, the imager 152 may be communicatively coupled to a lighting system 156 that provides specialized lighting settings to assist in effectively capturing suitable images of the tissue samples in the cassettes and on the slides. Optionally, the lighting system 156 may be computer controlled via the analyzer/image processor 120. The lighting system 156 may also include polarizers that are used to illuminate a field-of-view with polarized light. Illuminating the field of view with polarized light can reduce glints or glares in the field of view of the imager 152, thereby improving the imager's ability to obtain clear images of tissue samples, such as portions of tissue below a cut surface of the wax block. The field of view of the imager 152 is adjustable to cover the entire microscopy slide (WSI) 602, 702 (carrying a tissue sample slice) or an entire paraffin wax embedded tissue sample (that is, a tissue sample 202 embedded in a paraffin wax block 808, 908 that is carried by a cassette 802, 902). Optionally, there may be a plurality of computer-controlled lighting sources configured to enhance different aspects of the sample tissue containers. Note, that for the sake of clarity, the tissue samples 202 illustrated in FIGS. 2A, 2B are illustrated without the cassettes 802, 902 and the associated paraffin wax blocks 808, 908 into which the samples 202 are embedded.

The imager 152, lens system 154, and lighting system 156 are arranged within and/or supported by a housing 158. Optionally, the imager 152 and its associated lenses 154 may be sealed within the housing 158 with a window and access cover to keep dust, debris, and fluids from contaminating the imager 152 and its associated optical system (154). A ventilation port in the housing 158 may also be provided to facilitate fume abatement when used in the presence of typical pathology fixatives. The housing 158 will also allow for associated cabling to be unobstructed.

The imaging apparatus 150 also includes a positioning system 159 that provides for a quick change between imaging paraffin blocks 202 of different sizes (and thicknesses) and between slides 602, 702 of different sizes, to ensure proper centering and focus of the items to be imaged. As illustrated in FIG. 2A, the positioning system 159 is mechanically coupled to the imager 152 via the housing 158. Optionally, the positioning system 159 may be computer controlled via the image acquisition and archiving module of the analyzer/image processor 120. The imager 152 may also be configured to function as a barcode reader for reading the barcodes on the cassettes and slides holding tissue samples 202.

The imaging apparatus 150 includes a sample holder 160 with multiple configurable "positions." A first position for the sample holder 160 is a "slide" position. When the sample holder 160 is in the slide position, the sample holder 160 ensures that a slide-mounted tissue sample 202 is held in a proper position for centering and focal distance for the imager 152. The sample holder 160 may be configurable to accept and/or accommodate "whole mount" cassettes and "whole mount" slides. The sample holder 160 may be oriented into a "block" position. When the sample holder 160 is in the block position, the sample holder 160 ensures that a sample block 202 is held in a proper position for centering and focal distance for the imager 152.

The paraffin wax blocks 808, 908 (carried by cassettes 802, 902, respectively) and microscopy slides 602, 702 (each carrying tissue samples 202) are imaged with the imager 152 and its associated lens arrangement 154 selected and oriented to provide a field-of-view sufficient to image the entire tissue sample, with an optical diffraction blur circle equal to or less than the camera pixel size, and lockable adjustments on the lens system 154 of the imager 152 to allow imager settings for iris, focus, and polarization orientation. The exemplary fragments of tissue can be very small and will need to be visualized. It is also noted that embodiments of the present invention are directed to locating discrete sample pieces that were supplied in a sample container and then transferred into a cassette and then transferred into a paraffin wax substrate or embedding. In other words, exemplary embodiments are not directed to visualizing the details of the tissue sample, they are directed to visualizing whether or not the tissue is even present. Therefore, a typical core needle may be used as a guide to determine a smallest "practical or typical" tissue sample size to be tracked. For example, the smallest expected tissue sample size may be specified as ¼ of the diameter of a 22 gauge needle, or ½×0.413 mm=0.207 mm. In other words, the number of pixels per inch depends upon the smallest "practical/typical" piece of tissue to be tracked. A minimum resolution may therefore be based upon a Nyquist sampling criteria of >2 pixels per axial direction or >4 pixels for 2 axis area detection resulting in a pixel pitch of 0.052 mm. In practicality, a safety factor of greater than twice per axial direction 2×2=4 or 16 pixels per 2 axis area. The largest tissue/block/sample containers to image will be "whole mount" slides with an area up to 75 mm×55 mm. Combined with the pixel pitch (0.052 mm) results in a minimum camera resolution of 1,538×1,057.

The above described core or biopsy needles may typically range from 19 gauge to 25 gauge. Furthermore, the tissue samples acquired by such needles may break apart. When a tissue sample from a core/biopsy needle breaks apart, there could be ten or more smaller fragments within a single paraffin wax block that will need to be imaged. In addition, imagery management systems and methods of the present invention may be used to image blocks with tissue microarrays (TMAs), where the core of each tissue in a TMA can be as small as 0.1 mm in diameter, with a resulting required minimum resolution adjusted accordingly. In one embodiment, the imager 152 is a monochromatic imager. Other embodiments are also possible, such as color imagers and the like.

FIG. 2B illustrates an imager 252 installed as an accessory tool of a tissue slicing instrument 210. The imager 252, lens system 254, and lighting system 256 of FIG. 2B may be the same as the imager 152, lens system 154, and lighting system 156 of FIG. 2A. The imager 252, when installed as the accessory attachment, is positionable via a positioning system 209 to be properly oriented for capturing images of paraffin wax embedded tissue samples 202 placed/mounted onto a working surface 202 of the tissue slicing instrument 210. The tissue slicing instrument 210 has an adjustable slicing depth, such that a thickness of a slice may be selected. For example, a slice from a side of a tissue sample 202 may be typically 4-5 µm, but may range to 2 µm to 10 µm. When properly positioned, the imager 252 captures images of the tissue samples 202 during the sectioning or slicing process. As illustrated in FIG. 2B, the imager 252 is positioned to capture an image of an outer surface of a tissue sample 202 before that outer surface of the tissue sample 202 is sliced away from the tissue sample 202 by the tissue slicing instrument 210. That image of the tissue sample 202 may then be compared to a later image of that tissue sample slice after it has been treated and coverslipped. The comparison is performed to determine whether or not any tissue is missing from the later image. The comparison may also be performed to determine whether or not the tissue has become misaligned on the slide, or to detect other anomalies.

The image acquisition and archiving module of the analyzer/image processor 120 provides the following major functions: a live image preview function, an image acquisition function, a block finished/end cut image acquisition function, an image review function, and a pathologist review function. The live image preview function provides for a live image to be displayed on the display screen 108 that is visible to the user. Using the live image displayed on the display screen 108, the user is then able to setup the imager 152, 252 and the lighting 156, 256. The display screen 108 may optionally be a touch responsive display. Other embodiments are also available, e.g., a detachable display screen 108 or cabling to a remote display screen 108.

The image acquisition functionality of the analyzer/image processor 120 may be triggered to capture an image of each slide 602, 702 that has a tissue sample and a barcode label on it. As discussed herein, the imager 152 may optionally include a barcode reader. Similarly, a tissue sample block 202 may also be interrogated or scanned for a barcode. Once the associated barcode is read, its data may be parsed into appropriate field variables of a patient/case electronic record. Such records may be stored in a database 129 in either local memory 128 or a remote memory 178 of a server 170. Using the field variables, the captured image may be stored in the database 129 for the associated case/patient with field metadata indicating case/patient number, slide or tissue block number, and any other necessary fields.

The block finished/end cut image acquisition function of the analyzer/image processor 120 provides for the capturing of a first image of the paraffin block (and embedded tissue sample) 202 before any sections (slices) have been taken. A subsequent final image (after any sections/slices have been removed from the paraffin block 202) is also taken of the finished/end cut condition of the paraffin block 202 before the paraffin block 202 is filed away. Similar to the functionality discussed above with respect to processing slide mounted tissue samples 202, using the field variables from side barcodes previously captured, each image of a tissue sample 202 embedded in a wax block 808, 908 is stored in the database 129 for the case/patient with field metadata.

Figure 3A:
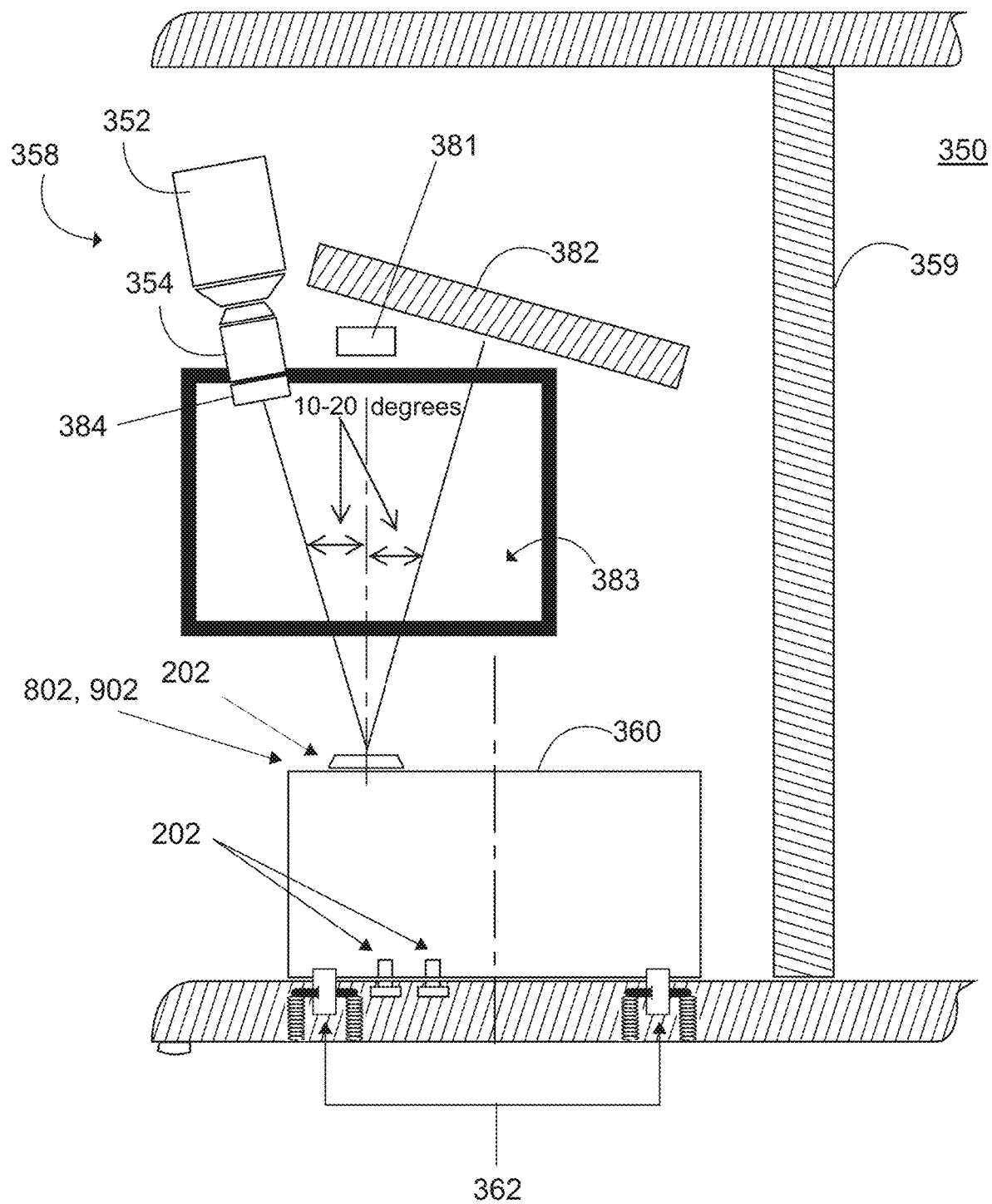
FIG. 3A is a side view of an exemplary imager system positioned with respect to a sample container.

FIG. 3A illustrates an alternative imaging apparatus 350, which includes a computer-controlled imager 352. As illustrated in FIG. 1, the imaging apparatus 350 is communicatively coupled to the analyzer/image processor 120, which as noted above, controls the operation of the imaging apparatus 350. Optionally, the imaging apparatus 350 is coupled to the analyzer/image processor 120 via a computer interface (e.g., USB 3.0). The imager 352 includes a lens system 354 that is adjustable for a desired focus and/or iris setting. Optionally, the lens system 354 may be a manual lens with manually actuated focus, shutter speed, and iris (aperture) controls. In a further optional embodiment, the lens system 354 has automatic settings that are actuated via the analyzer/image processor 120. In one embodiment, the imager 352 is a monochromatic imager. Other embodiments are also possible, such as color imagers and the like.

As illustrated in FIG. 3A, the imaging apparatus 350 also includes a range finder 381 for determining a range between the imager 352 and a surface of a paraffin wax block 808, 908. In one embodiment, the range finder 381 is a pair of ultrasonic, time-of-flight (TOF) sensors. A first ultrasonic sensor is used to read a standard reference distance in order to provide a temperature, pressure, and humidity compensation factor. A second ultrasonic sensor measures the focal distance of interest, and uses the compensation factor from the first sensor to ensure that the focal distance is measured accurately in the present environmental conditions. As discussed herein, the range can vary depending on the type of cassette (802, 902) used, as well as varying according to the number of slices that have been sliced (sectioned) from the tissue embedded paraffin wax block. The range between the cut surface of the paraffin wax block 806, 906 and the range finder 381 will increase as the sectioning process continues. Once the range finder 381 determines a distance to the surface of the paraffin wax embedded tissue sample, a focal length is determined such that the lens system 354 adjusts to focus on the surface of the paraffin wax embedded tissue sample. Optionally, the imaging apparatus 350 determines the updated focal length and adjusts the focus of the lens system 354 in an automated fashion. In an alternative embodiment, using the updated focal length information, the lens system 354 is manually adjusted by an operator to bring the surface of the paraffin wax embedded tissue sample into focus.

The imaging apparatus 350 also includes a reflected light panel 382 and an oblique polarized light panel 383 (and associated polarizer 384). Controlled by the imaging apparatus 350, the light panel 382, the polarized light panel 383, and polarizer 384 provide specialized lighting settings to assist in effectively capturing suitable images of the tissue samples in the cassettes 802, 902 and on the slides 602, 702. Optionally, the lighting system (382, 383) may be computer controlled via the analyzer/image processor 120. As discussed herein, illuminating the field of view with polarized light (via the polarized light panel 383 and polarizer 384) can reduce glints or glares in the field of view of the imager 352, thereby improving the imager's ability to obtain clear images of tissue samples 202, such as portions of tissue (202b) below a cut surface of the wax block 802, 902. The field of view of the imager 352 is adjustable to cover the entire microscopy slide 602, 702 or an entire paraffin wax block 808, 908, each wax block including an embedded sample 202. As also illustrated in FIG. 3A, the lighting system 382 and the imager/lens system (352, 354) are positioned with respect to the cut surface of the wax block 802, 902 at an angle of about 10-20 degrees from perpendicular, such that the reflecting light (from the lighting system 382) angles off the wax block 802, 902 and enhances the cut surface of the wax block. The effect of angled light reflecting off the cut surface of the wax block 802, 902 is discussed in detail below. As also illustrated in FIG. 3A, the lighting system 382 and the imager/lens system (342, 354) are positioned relative to each other at a suitable angle so that the cut surface of the wax block is highly reflective of the light, which is directed from the wax block to the lens, and creates significant contrast between the cut surface of the wax block and the cut surface of the tissue in the wax block.

The imager 352 and lens system 354 may be arranged within or supported by a housing 358. Optionally, the imager 352 and its associated lenses 354 may be sealed within the housing 358 with a window and access cover to keep dust, debris, and fluids from contaminating the imager 352 and its associated optical system 354. A ventilation port in the housing 358 may also be provided to facilitate fume abatement when used in the presence of typical pathology fixatives. The housing 358 will also allow for associated cabling to be unobstructed.

The imaging apparatus 350 also includes a positioning system 359 that provides for a quick change between imaging paraffin blocks 808, 908 of different sizes (and thicknesses) and between slides 602, 702 of different sizes, to ensure proper centering and focus of the items to be imaged. The positioning system 359 is mechanically coupled to the imager 352 via the housing 358. Optionally, the positioning system 359 may be computer-controlled via the image acquisition and archiving module of the analyzer/image processor 120. As discussed below, the imager 352 may also be configured to function as a barcode reader for reading the barcodes on cassettes 802, 902 and slides 602, 702 holding tissue samples 202.

The imaging apparatus 350 includes a sample holder 360 with multiple configurable "positions." As illustrated in FIG. 3A, the sample holder 360 is equipped with a plurality of feet 362 that include a plurality of detents for position stops, as well as a plurality of Hall Effect sensors 364 for position encoding. A first position for the sample holder 360 is a "slide" position. When the sample holder 360 is in the slide position, the sample holder 360 ensures that a slide-mounted tissue sample 202 is held in a proper position for centering and focal distance for the imager 352. The focal length may be confirmed with the range finder 381. The sample holder 360 may be configurable to accept and/or accommodate "whole mount" cassettes and "whole mount" slides. Next, the sample holder 360 may be oriented into a "block" position. When the sample holder 360 is in the block position, the sample holder 360 ensures that a sample 202 embedded in a wax block 808, 908 and carried on a cassette 802, 902 (see FIGS. 8 and 9), is held in a proper position for centering and focal distance for the imager 352. Optionally, the block position may be divided into a plurality of sub-positions, such as a "small cassette" (802) position and a "large cassette" (902) position.

Figure 3B:
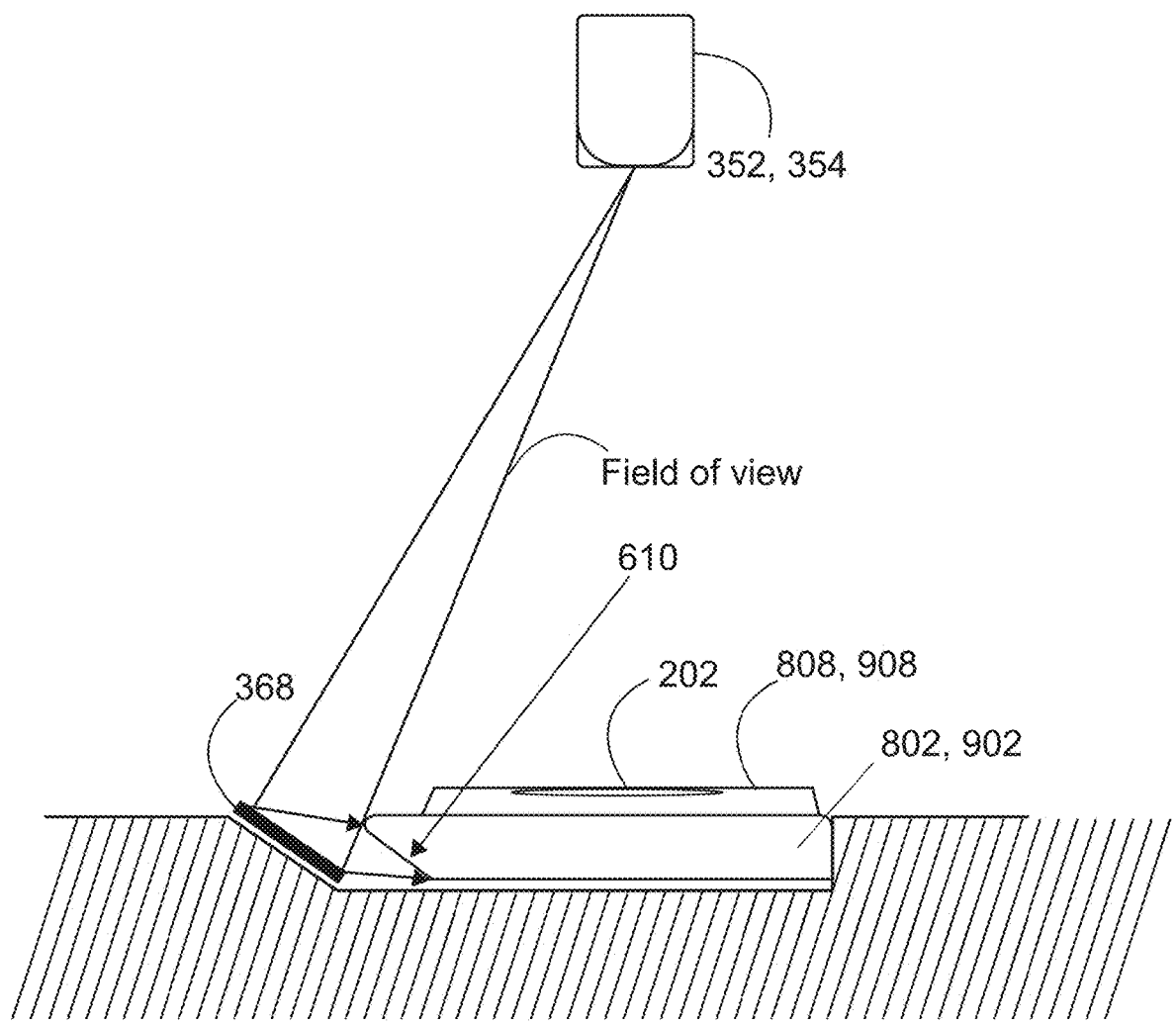
FIG. 3B is a front view of an imager configured to view a downwardly facing cassette barcode without removing the cassette from a sample holder in accordance with the present invention.

FIG. 3B illustrates the imager 352 used to read a barcode 610 printed on a cassette 802, 902 without having to remove the cassette 802, 902 from the sample holder 360. The cassettes 802, 902 illustrated in FIGS. 8 and 9 have barcodes 610 that are facing downward at a 45-degree angle. As illustrated in FIG. 3B, the sample holder 360 includes a cavity 366 configured for retaining a cassette 802, 902 positioned on the sample holder 360. The sample holder's cavity 366 includes a mirrored surface 368 (or a mirror 368 positioned against that surface of the cavity 366) that is positioned to allow the imager 352's field of view to view the barcode 610. As illustrated in FIG. 3B, the field of view of the imager 352 is reversed by the mirror such that the barcode 610 is imaged right side up without need for removing the cassette 802, 902 from the sample holder cavity 366.

FIG. 4 illustrates a method for image enhancement for clearly identifying the cut tissue boundaries of a tissue sample 202 embedded in a wax block 808, 908 as it is sliced (sectioned). As discussed herein, multiple tissue samples 202 can be embedded in a single wax block 808, 908, and can be embedded at different depths. Furthermore, even if only a single sample 202 was embedded into a wax block 808, 908, it is possible for the tissue sample 202 to be improperly or unusually placed in the wax block 808, 908, e.g., at an odd or incorrect angle. Therefore, whenever tissue-embedded wax blocks are sectioned, there is a concern as to whether all of a tissue sample has been completely sectioned or whether there is more of the tissue sample 202 deeper into the wax block 808, 908. Such determinations are complicated by the fact that the wax is slightly translucent and it is not always clear what portions of the sample 202 are below the cut surface of the wax block 808, 908.

To address these issues, an image enhancement process is provided that combines a first image of the tissue sample embedded wax block 808, 908 illuminated with polarized light, with a second image of the tissue sample embedded wax block 808, 908 illuminated with non-polarized light. When the polarized light source (383) and polarizer 384 are used, the captured image contains details of a tissue sample that is deep within the wax block 808, 908 because the surface reflections found in traditional images of the wax block are absent. When the second image is captured, the glancing, non-polarized light allows for the relatively dull surface of the tissue sample 202 to be easily visualized against the relatively shiny surface of the wax block 808, 908. Thus, while the first image captures details deep within the wax block 808, 908, the second image captures surface details, such as an outline of the tissue sample 202 at the cut surface of the wax block 808, 908. Note that the resulting outline of the tissue sample 808, 908 is of a cut or sectioned surface of the wax block 808, 908. Thus, when the first or second image is overlaid upon the other image, a practitioner or an image analysis program is able to view both the below-surface portions (202b) of the embedded tissue sample 202 (from the first image) and the outline (202a) of the tissue sample 202 present at the cut surface of the wax block 808, 908 (from the second image) (see FIGS. 11-15). Optionally, an intensity of the polarization or edge detection may be adjusted to change both the image overlay and the edge detection. That is, by adjusting the image processing, the practitioner or image analysis software is able to focus on a desired feature of the wax block 808, 908 (e.g., seeing more deeply into the wax block 808, 908 and/or more clearly identifying an outline of the sample 202 at the cut surface of the wax block 808, 908.

Figure 10:
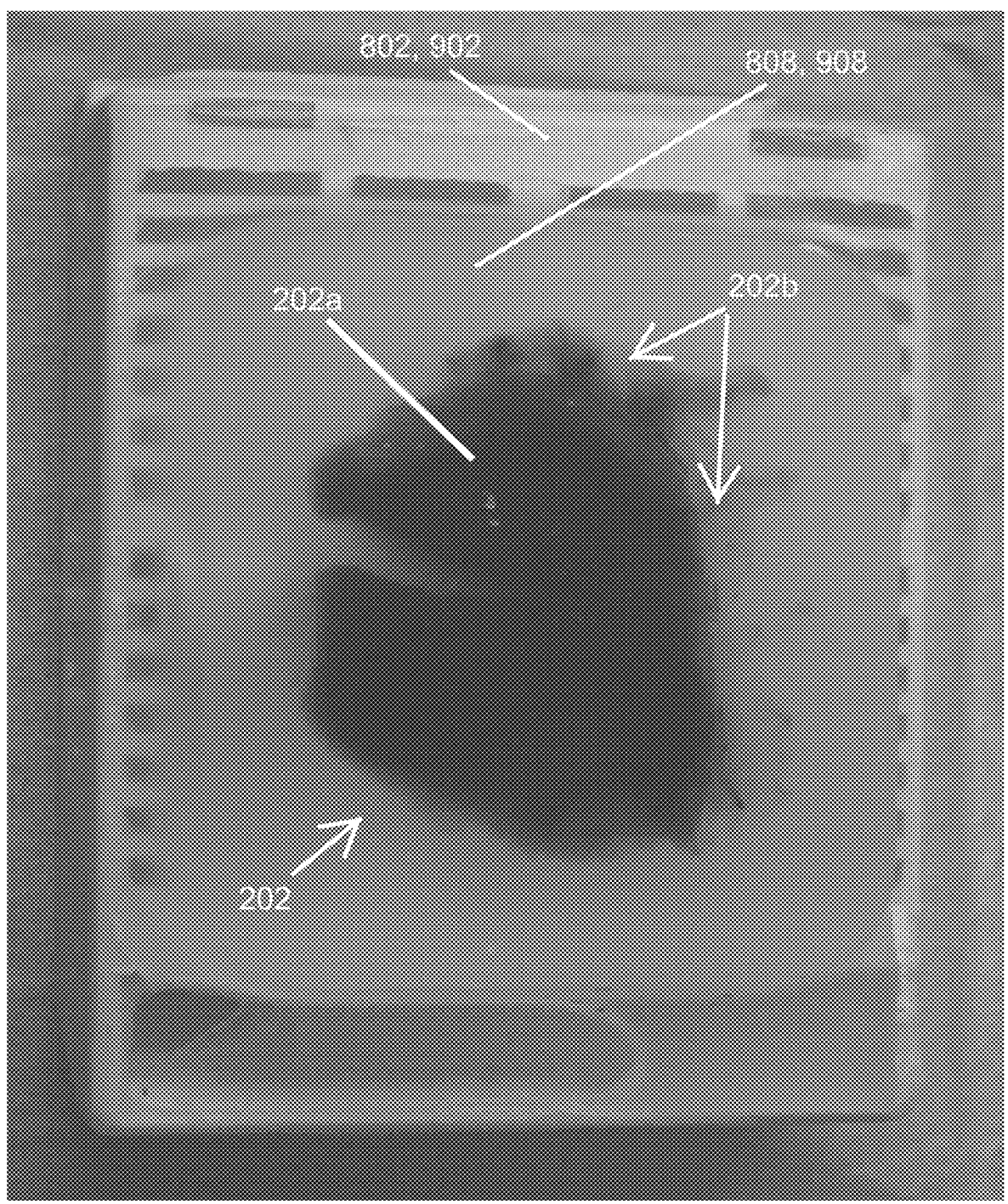
FIG. 10 is an exemplary polarized image of a tissue sample embedded in a wax block.

The enhancement process begins in step 402 of FIG. 4, where a first image is captured of a cassette 802, 902 holding a wax block 808, 908 with an embedded tissue sample 202. As discussed herein, the embedded tissue sample 202 is located within the imager's field of view when the cassette 802, 902 is positioned in the cavity 366 of the sample holder 360. This first image is captured with polarized light (utilizing the oblique polarized light panel 383 and the polarizer 384). With the first image captured with polarized light, the normal reflections and glare have been greatly reduced and sub-surface details (202b) below the cut surface of the wax block 808, 908 will be visible. This is illustrated in FIG. 10, where details of the tissue sample 202 are visible (cut tissue 202a, and uncut tissue 202b). As discussed herein, the cut tissue 202a is found within that portion of the tissue 202 that has been sliced (sectioned), while the un-cut tissue 202b is that portion of the tissue sample 202 that is below the surface of the wax block 808, 908 and is yet un-cut. FIG. 10 illustrates that while using polarized light allows for sub-surface details of the tissue sample 202 to be visualized, those portions of the tissue sample 202 that are cut tissue (202a) are hard to identify with this single image.

Figure 11:
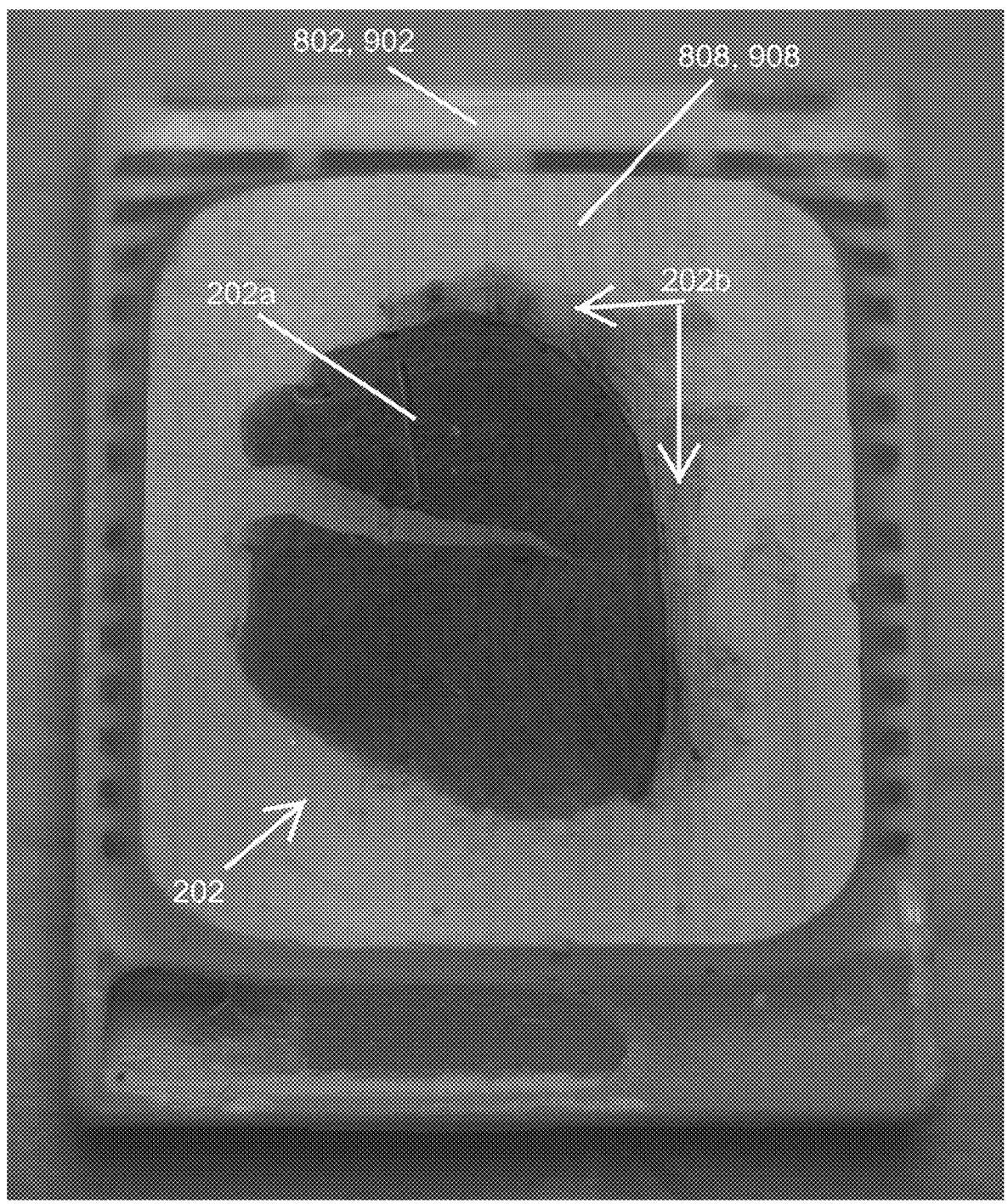
FIG. 11 is an exemplary non-polarized image of the tissue sample embedded in the wax block of FIG. 10.

In step 404 of FIG. 4, a second image is captured of the cassette 802, 902 of step 402 (still holding the same wax block 808, 908 with the embedded tissue sample 202). This second image is captured with non-polarized light (utilizing the reflected light panel 382). With the second image captured with angled, non-polarized light, glare and reflections are purposefully produced upon the waxy surface of the wax block 808, 908, while low reflections are found in other portions of the second image that are areas with cut tissue 202a, which are particularly dull. This results in significant contrast between the waxy portions of the wax block 808, 908 that do not contain cut tissue 202a, and those portions of the surface of the wax block 808, 908 that do contain the cut tissue portions 202a. This is illustrated in FIG. 11, where details of the cut tissue portions 202a are more easily visualized as compared to in FIG. 10.

In step 406 of FIG. 4, an image of the barcode 610 is captured. As illustrated in FIG. 3B, the field of view of the imager 352 is shifted to find the reflection of the barcode 610 in the mirror 366. Because of the changing field of view, the imager 352 will refocus to find the barcode 610.

Figure 12:
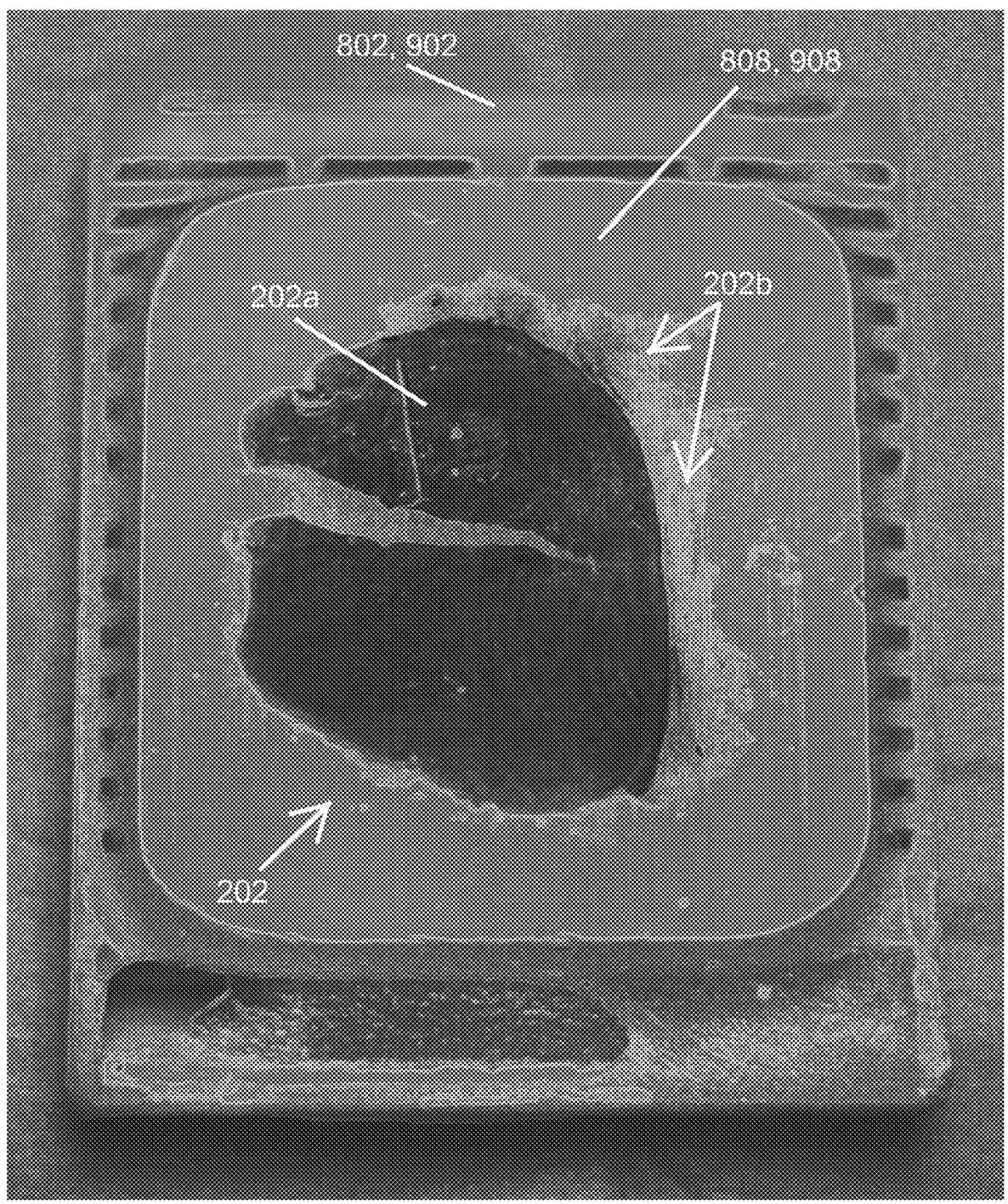
FIG. 12 is an exemplary processed image of the tissue sample embedded in a wax block of FIG. 10, illustrating an overlay of the polarized and non-polarized images in accordance with the present invention.

In step 408 of FIG. 4, the second image is used as an overlay atop the first image. In the alternative, the first time is used as an overlay atop the second image. Such an overlay image is illustrated in FIG. 12. In FIG. 12, the overlay image (created from the combination of the first and second images) is further processed. The image processing may include: 1) conversion of the images to monochrome, 2) histogram adjustment for contrast enhancement to aid in identifying the edges of the cut tissue 202a, 3) actual edge detection, 4) palletization of the color channel to enhance viewing, and then 5) presenting the image as an overlay with adjustable transparency and intensity controls. The enhanced tissue boundary images may then be used for analysis of the plurality of images taken from cut wax blocks, raw slides, and fully processed slides to identify any loss of tissue between paired images of the same tissue sample (comparing an original image of a wax block-embedded tissue sample to an image of a slide mounted tissue sample slice).

Figure 13:
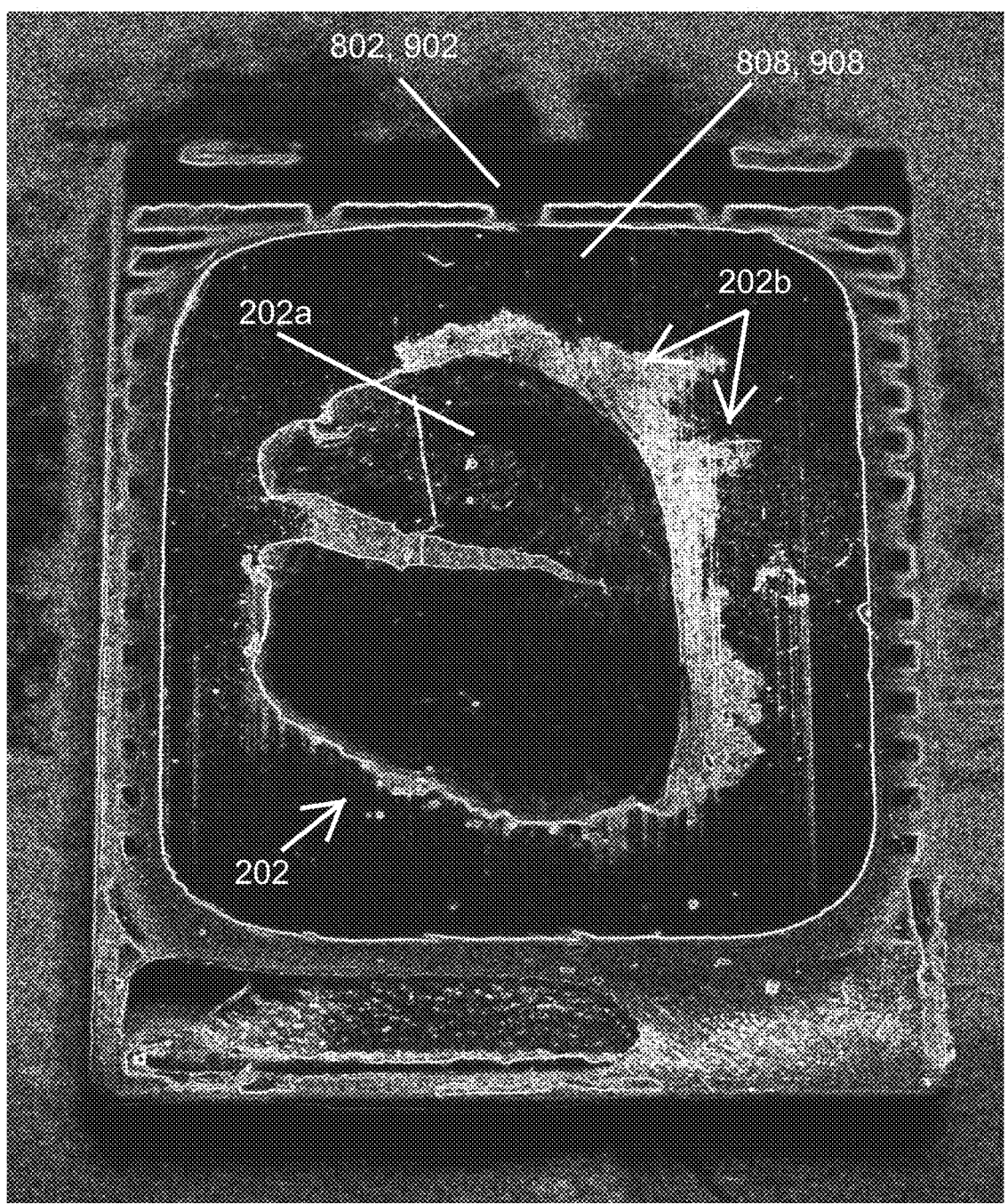
FIG. 13 is another exemplary processed image of the tissue sample embedded in a wax block of FIG. 10, illustrating an overlay of the polarized and non-polarized images in accordance with the present invention.
Figure 14:
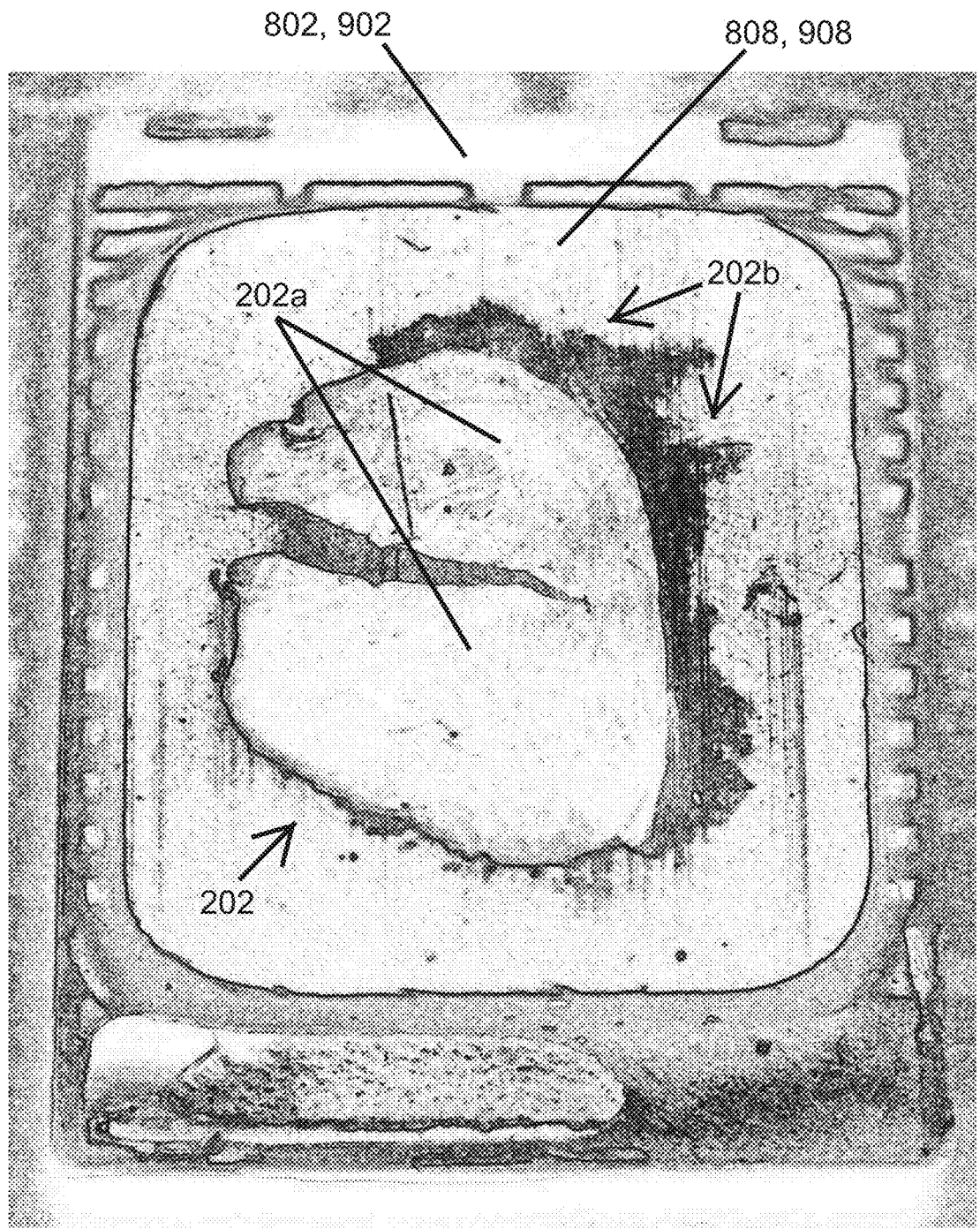
FIG. 14 is a further exemplary processed image of the tissue sample embedded in a wax block of FIG. 10, illustrating an overlay of the polarized and non-polarized images in accordance with the present invention.
Figure 15A:
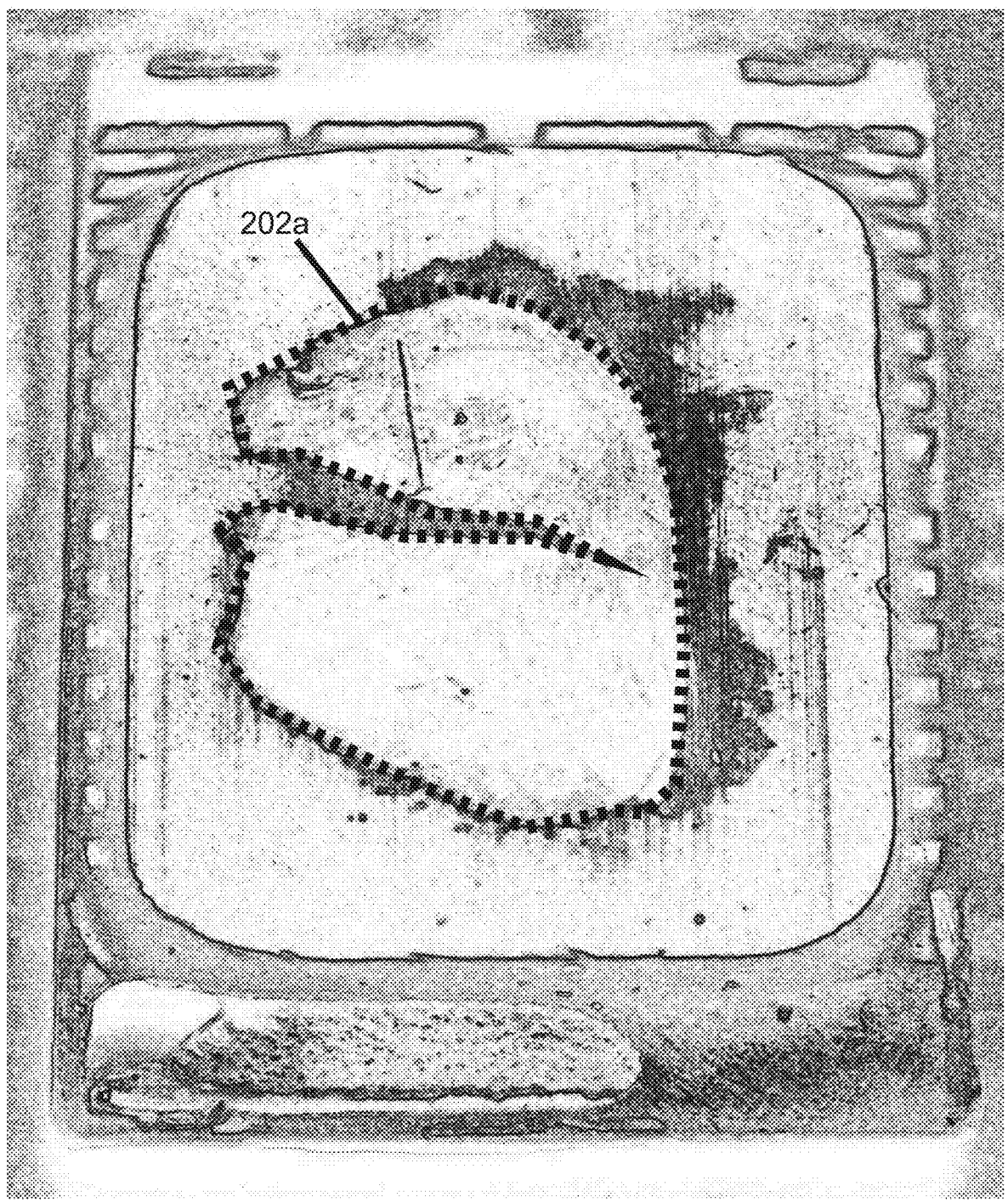
FIG. 15A is an exemplary processed image of the tissue sample embedded in the wax block of FIG. 14, highlighting an outline of the "cut" portion of tissue embedded in the wax block of FIG. 14 in accordance with the present invention.
Figure 15B:
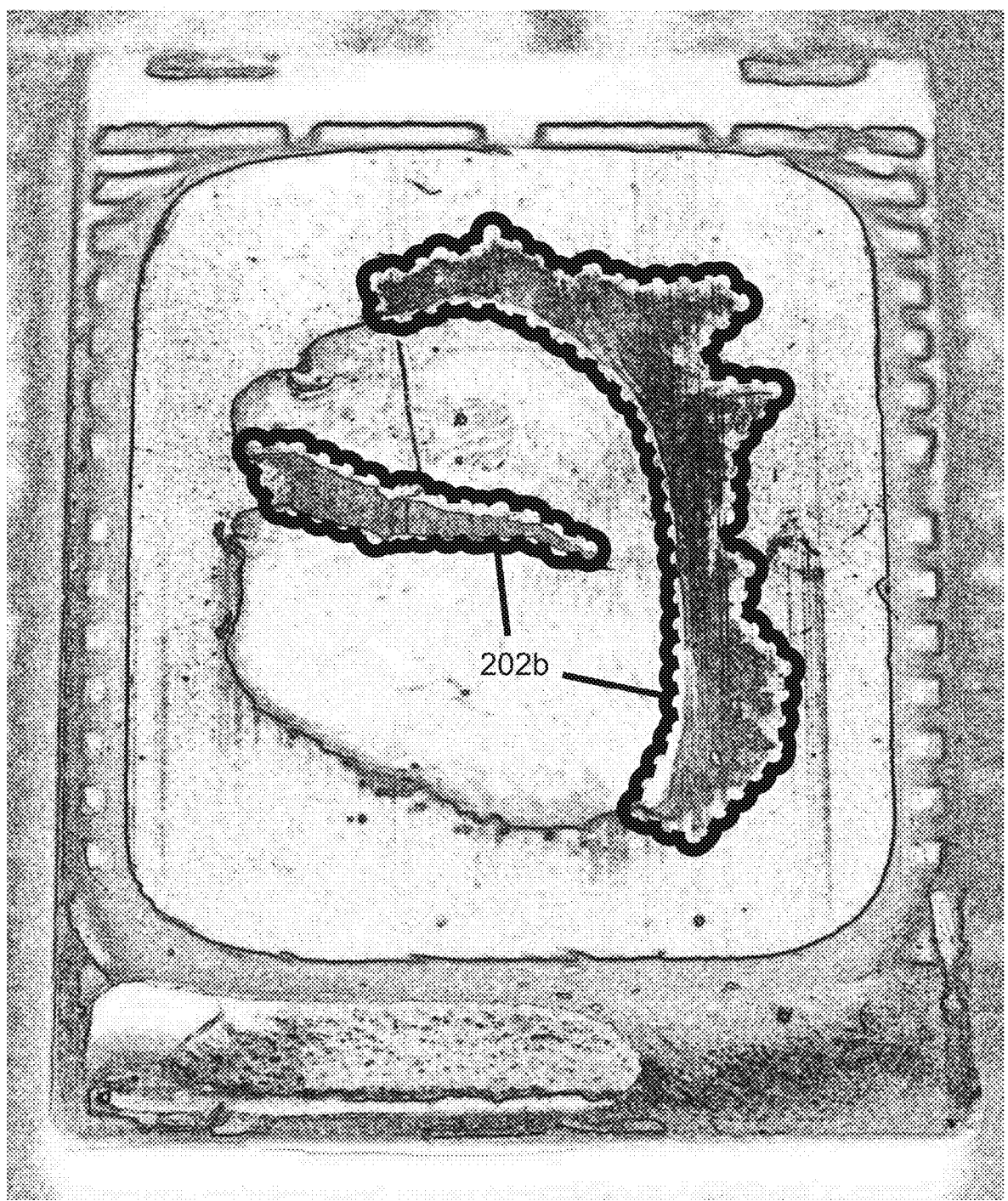
FIG. 15B is an exemplary processed image of the tissue sample embedded in the wax block of FIG. 10, highlighting an outline of the "uncut" portions of tissue embedded in, and below the cut surface of the wax block of FIG. 14 in accordance with the present invention.

The image processing is further illustrated in FIGS. 13-15. In FIG. 13, the overlay image of FIG. 12 has been converted into a monochromatic (black & white) image. In FIG. 14, the black and white image of FIG. 13 is further converted into a "negative" image to aid in visualization of the tissue sample boundaries. Meanwhile, FIGS. 15A and 15B illustrate the boundaries of the cut tissue 202a and the boundaries of the un-cut tissue 202b (below the surface of the wax). Boundaries of the cut tissue 202a are illustrated in FIG. 15A, while boundaries of the un-cut tissue 202b are illustrated in FIG. 15B. These boundaries may be adjusted through image processing to make either or both of the boundaries more visible or to provide desired information related to the cut and un-cut tissue portions 202a, 202b.

The image acquisition functionality of the analyzer/image processor 120 also provides for an image view mode that is displayed on the display screen 108. The image view mode allows the user to inspect captured images and either accept or reject the image they are currently viewing. If rejected, the image acquisition functionality will prompt the user to retake the image (or images).

The image review function may be used to call up previously stored images (from the database 129) from a selected case/patient entry to review the called-up images. The image review function allows those images to be measured and annotated, as well as exported.

The pathologist review function of the analyzer/image processor 120 allows for a pathologist, or other professional, to sign out a case for review. The pathologist or other professional may then review any matching tissue sample embedded wax blocks 808, 908 or slides 602, 702 (associated with the patient/case) by looking them up from within a case archive or from within the LIS.

The image analysis module of the analyzer/image processor 120 may be included as part of an image acquisition workstation or as a standalone image review system. As part of an imaging workstation, the image analysis module will also support a live mode preview of the tissue slides 602, 702. The image analysis module will also support image capture, barcode reading and parsing from the captured image data. The image analysis module will also associate the body of the slide 602, 702 to a barcode read. The archived slide images (including the start and finished/end images) may be retrieved from the electronic medical records (stored in the database 129) for use by the image analysis module of the analyzer/image processor 120. The image analysis module may be used to determine if there is tissue missing from the corresponding scanned slides 602, 702. The image analysis may include the use of tissue centroid positions, tissue area comparisons, and previous and next slide progressions to determine whether centroid and area progressions are within reason or are questionable and require user review. As used herein, centroid or area "progression" refers to a change of location of the centroid or area of a tissue sample as determined from one image to the next. Lastly, as a part of an image acquisition workstation, the image analysis module includes interfaces for: flagging slides 602, 702 for user review, archiving the images and results to the LIS for the case, and reporting to review completed cases via associated images, data, and reports.

As part of a standalone image review system, the image analysis module of the analyzer/image processor 120 will support the retrieval of slide images (including the start and finished/end images) from the LIS. With the retrieval of the slide images, as discussed above, image analysis may be performed to determine if there is tissue missing from the slide images. The image analysis may include the use of tissue centroid positions, tissue area comparisons, and previous and next slide progressions to determine whether centroid and area progressions are within reason or are questionable and require user review. Similar to the imaging workstation, when the image analysis module is included as part of a standalone image review system, the image analysis module includes interfaces for: flagging slides 602, 702 for user review, archiving the images and results to the LIS for the case, and reporting to review completed cases via associated images, data, and reports.

Figure 5:
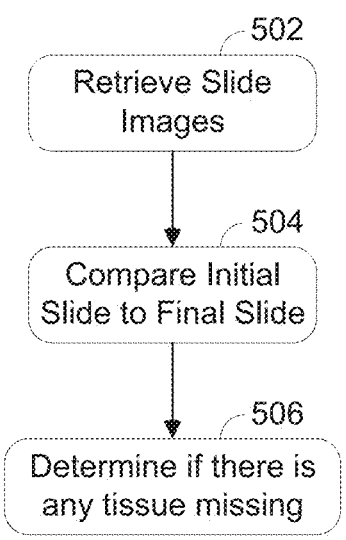
FIG. 5 is a flow diagram illustrating a method for determining if there is any tissue missing from slide images.

FIG. 5 illustrates the steps to a method for image analysis used to determine if there is any tissue missing from slide images. In step 502, images are retrieved from an electronic file archive (e.g., the database 129 either stored locally or remotely in a server 170 that is part of a LIS. The images associated with a particular case/patient may be selected from a case index. The selected images may include images of tissue slices on microscopy slides 602, 702, and tissue samples 202 embedded in paraffin wax blocks 808, 908. In step 304, a series of slide images are compared in a progression of images. For example, a first image of a cut surface of a paraffin wax embedded tissue sample 202, along with a progressive series of images of the surface of the paraffin wax embedded tissue sample 202 during sectioning, are compared to a series of "final" slide images that include the surface of the paraffin wax embedded tissue sample 202 after it has been processed and mounted in a slide 602, 702. In other words, an image of each tissue sample surface before sectioning is compared to a slide image of that tissue sample surface after sectioning and final processing. By comparing "before" and "after" images, in step 306 it can be determined whether there is any tissue missing from the after or final slide images, or whether there are any other anomalies. Steps 302, 304, and 306 are performed in the GPU 126 or alternatively in the CPU 124.

The imagery management system 100 may also include provisions to facilitate HIPAA compliant data transmission and encryption and backup protocol features to ensure data security. Such steps are related to the encryption of transmitted data as well as a buffered hierarchical database structure that will store data locally for use during LAN outages.

When the imagery management system 100 locates data targeted for the workstation that it is on, it sends a notification to the user's own desktop computer or other personal computing device that new data is available. The user then selects the data, copies the data to temporary memory ("clipboard"), such as memory 128, and then can transfer ("paste") the data into the laboratory information system tracking input field found in the server's memory 178. This can save the user time and reduce the occurrence of error related to missed containers.

A tissue chain of custody module may be configured to work in conjunction with the scanned data stored in the database 129 and will provide several quality assurance (QA) evaluations. In an exemplary manual evaluation mode, slide images are captured from a slide index, the barcode is read (on the image), and then the corresponding images for the slide just after tissue cutting and the cut block are retrieved for comparison to a final stained slide image for the operator to evaluate if any tissue has been lost or significantly altered during processing. The operator is also able to determine if any tissue was not cut at the current cut level (that is, was displaced deeper in the paraffin). In an automated evaluation mode, the just-cut slide image will be compared to the final stained slide image. Image analysis will be used to determine if any tissue is missing in the final slide. The automated evaluation mode will also flag any slides that exhibit differences for the operator to review. Images of the cut block will also be provided to the operator such that the current slide may be evaluated for cut depth issues.

Thus, microscopy slides 602, 702 and paraffin wax embedded tissue samples 202 (e.g., tissue samples 202 embedded into wax blocks 808, 908 that are mounted on cassettes 802, 902, respectively) may be imaged and the resulting images archived (e.g., stored in a database 129 in a memory 178). These archived images may then be indexed by patient/case such that a series of images related to a particular patient/case may be retrieved and analyzed at a later date. Such analysis may include image analysis of a progressive series of "final" slide images and block images to determine if there is any tissue missing from the final slide images. In other words, an image of each tissue sample surface before sectioning is compared to a slide image of that tissue sample surface after sectioning and final processing (e.g., staining). By comparing "before" and "after" images, it can be determined whether there is any tissue missing, altered, or displaced from the after or final slide images.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An apparatus for imaging, managing, and analyzing images of tissue samples, the apparatus comprising:
   an imager configured to capture images within a selectable field of view, wherein tissue sample containers supporting respective barcodes and tissue samples are positionable within the field of view, and wherein the imager is configured to capture images of the tissue sample containers, the captured images comprising images of barcodes and images of tissue samples;
   a processor configured to associate each barcode image with a corresponding tissue sample image to create a barcode association for each tissue sample image;
   wherein the processor is configured to receive a plurality of tissue sample images, each with the same barcode association; and
   wherein the processor is operable to analyze the plurality of tissue sample images having the same barcode association and to determine whether there is a tissue mismatch between any two or more images of the plurality of tissue sample images having the same barcode association, and wherein tissue sample images having the same barcode association are images of a same tissue sample.

2. The apparatus of claim 1, further in combination with the tissue sample container and the apparatus further comprising a sample holder configured to support and retain the tissue sample container, wherein the tissue sample container is any one of a microscopy slide carrying a tissue sample slice and a tissue sample embedded substrate block carried by a cassette, and wherein the sample holder is selectively configurable for supporting and retaining the microscopy slide or the substrate block carried by the cassette.

3. The apparatus of claim 1 further comprising a lighting system configured to illuminate the field of view, wherein the lighting system comprises a non-polarized light source and a polarized light source configured to reduce glints in the field of view.

4. The apparatus of claim 1, wherein the processor is operable to compare a first image of a tissue sample embedded in a substrate block to a second image of a tissue sample slice mounted at a microscopy slide, wherein the first image comprises an image of cut tissue present at a cut surface of the substrate block, wherein the second image comprises an image of tissue present in a tissue sample slice, wherein the first image and the second image have the same barcode association, wherein the processor is operable to determine whether there is a tissue mismatch between the first image and the second image.

5. The apparatus of claim 1 further comprising a display screen configured to display a live image of the tissue sample container positioned within the field of view.

6. The apparatus of claim 1 further comprising a memory configured to store a database, wherein the database is configured to store tissue sample images, wherein the database comprises pluralities of tissue sample images, each plurality having a respective barcode association, wherein the processor is configured to store tissue sample images captured by the imager, each with a respective barcode association, in the database, wherein the processor is configured to retrieve and process the tissue sample images stored in the database.

7. The apparatus of claim 6 further comprising a local memory, wherein the memory is a network accessed server memory, wherein the processor is configured to receive data from the server memory and to store the data in the local memory, and wherein the data comprises at least one of tissue sample images and medical records, each associated with a particular barcode.

8. The apparatus of claim 7 further comprising a plurality of standalone imagers, each configured as an accessory of a respective tissue sample processing instrument, wherein each standalone imager of the plurality of standalone imagers is configured to capture tissue sample images, to associate each tissue sample image with a corresponding barcode, and to store the tissue sample images, each with a respective barcode association, in the database.

9. The apparatus of claim 8, wherein a tissue mismatch between tissue sample images having the same barcode association comprises at least one of: tissue anomalies in a tissue sample image; misalignment of a tissue sample on a tissue sample container; and tissue missing from a tissue sample image due to: 1) loss of tissue during tissue sample processing; 2) missing tissue detected below a cut surface of a substrate block that is not included in a tissue sample slice; and 3) incomplete image scanning of a tissue sample.

10. A method for capturing images of tissue samples, the method comprising:
positioning a tissue sample within a selectable field of view, wherein the tissue sample is embedded in a substrate block;
illuminating the substrate block embedded tissue sample with a polarized light;
capturing a first image of the substrate block embedded tissue sample positioned within the field of view;
illuminating the substrate block embedded tissue sample with a non-polarized light;
capturing a second image of the substrate block embedded tissue sample positioned within the field of view;
processing the first and second images to create an overlay image comprising the second image overlaying the first image;
identifying cut tissue in the substrate block embedded tissue sample, wherein the cut tissue is tissue present at a cut surface of the substrate block after slicing;
identifying uncut tissue in the substrate block embedded tissue sample, wherein the uncut tissue is tissue present below the cut surface of the substrate block after slicing;
identifying a boundary of the cut tissue with respect to the uncut tissue; and storing the overlay image in an archive.

11. The method of claim 10, wherein the substrate block embedded tissue sample is mounted on a cassette.

12. The method of claim 10, wherein said illuminating the substrate block embedded tissue sample with a polarized light comprises illuminating the substrate block embedded tissue sample with a polarized light source, wherein said capturing said first image comprises use of a polarizing filter, and wherein the polarized light reduces glints, glare, and reflections in the field of view.

13. The method of claim 10, wherein said illuminating the substrate block embedded tissue sample with non-polarized light comprises illuminating the substrate block embedded tissue sample with a light source that is angled from the perpendicular with respect to the cut surface of the substrate block.

14. The method of claim 13, wherein the angled light produces glints, glare, and reflections on the surface of the substrate block, and wherein the cut tissue remains dull and substantially without glints, glare, and reflections.

15. The method of claim 10 further comprising a subsequent slicing of the substrate block embedded tissue sample to create a tissue sample slice, wherein the tissue sample slice comprises at least some tissue that was present in the substrate block embedded tissue sample.

16. The method of claim 15 further comprising processing the tissue sample slice to create a slide mounted tissue sample, and wherein the slide mounted tissue sample is a final stained and cover slipped slide of the tissue sample slice.

17. The method of claim 15 further comprising capturing an image of the slide mounted tissue sample.

18. The method of claim 17 further comprising pairing the overlay image with the image of the slide mounted tissue sample to create a first pair of images, and wherein tissue present in the slide mounted tissue sample includes at least a portion of the tissue present in the overlay image.

19. The method of claim 18 further comprising adding the first pair of images to a progressive series of paired images, and further comprising storing the progressive series of paired images in the archive.

20. The method of claim 18 further comprising analyzing the first pair of images to determine whether there is tissue missing from the image of the slide mounted tissue sample.

21. The method of claim 20, wherein analyzing the first pair of images comprises reviewing the boundary of the cut tissue with respect to the uncut tissue in the substrate block embedded tissue sample to determine whether any tissue present in the overlay image is missing from the image of the slide mounted tissue sample.

22. The method of claim 10 further comprising displaying a live image of a substrate block embedded tissue sample positioned within the field of view, and further comprising adjusting at least one of a level of light polarization and light intensity level to adjust at least one of a transparency of the substrate block and an intensity of a boundary of the cut tissue.

23. A method for capturing and analyzing images of tissue samples, the method comprising:

positioning a tissue sample within a selectable field of view, wherein the tissue sample is embedded in a substrate block;

capturing an image of the substrate block embedded tissue sample positioned within the field of view;

slicing the substrate block embedded tissue sample to create a tissue sample slice, wherein the tissue sample slice is a slide mounted tissue sample, and wherein the tissue sample slice comprises at least some tissue that was present in the substrate block embedded tissue sample;

capturing an image of the slide mounted tissue sample positioned within the field of view; and analyzing the images to determine whether there is tissue present in the image of the substrate block embedded tissue sample that is missing from the image of the slide mounted tissue sample.

24. The method of claim 23 further comprising:
identifying cut tissue in the substrate block embedded tissue sample, wherein the cut tissue is tissue present at a cut surface of the substrate block after slicing;
identifying uncut tissue in the substrate block embedded tissue sample, wherein the uncut tissue is tissue present below the cut surface of the substrate block after slicing; and
identifying a boundary of the cut tissue with respect to the uncut tissue; and storing the overlay image in an archive.

25. The method of claim 23, wherein analyzing the images comprises reviewing the boundary of the cut tissue with respect to the uncut tissue in the substrate block embedded tissue sample to determine whether any tissue present in the image of the substrate block embedded tissue sample is missing from the image of the slide mounted tissue sample.

* * * * *

UNITED STATES PATENT AND TRADEMARK OFFICE
CERTIFICATE OF CORRECTION

PATENT NO. : 11,257,216 B2  
APPLICATION NO. : 16/688613  
DATED : February 22, 2022  
INVENTOR(S) : Philip T. Merlo et al.

Page 1 of 1

It is certified that error appears in the above-identified patent and that said Letters Patent is hereby corrected as shown below:

In the Claims

Column 16:
Line 39, Claim 17, "of claim 15 further" should be --of claim 16 further--

Signed and Sealed this
Twenty-seventh Day of May, 2025

Coke Morgan Stewart
*Acting Director of the United States Patent and Trademark Office*